US011997021B1

(12) United States Patent
Gunuputi Alluri Venka et al.

(10) Patent No.: US 11,997,021 B1
(45) Date of Patent: May 28, 2024

(54) AUTOMATED PROVISIONING TECHNIQUES FOR DISTRIBUTED APPLICATIONS WITH INDEPENDENT RESOURCE MANAGEMENT AT CONSTITUENT SERVICES

(71) Applicant: Amazon Technologies, Inc., Seattle, WA (US)

(72) Inventors: Satya Naga Satis Kumar Gunuputi Alluri Venka, Sammamish, WA (US); John Baker, Bellevue, WA (US); Shahab Shekari, Seattle, WA (US); Kartik Natarajan, Shoreline, WA (US); Ruhaab Markas, The Colony, TX (US); Ganesh Kumar Gella, Redmond, WA (US); Santosh Kumar Ameti, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/193,502

(22) Filed: Mar. 30, 2023

(51) Int. Cl.
*H04L 47/762* (2022.01)
(52) U.S. Cl.
CPC ................... *H04L 47/762* (2013.01)
(58) Field of Classification Search
CPC .................................................. H04L 47/762
See application file for complete search history.

(56) References Cited

U.S. PATENT DOCUMENTS

| 8,706,852 | B2 | 4/2014 | Kunze et al. |
| 8,997,107 | B2 | 3/2015 | Jain |
| 9,412,075 | B2 | 8/2016 | Padala et al. |
| 10,223,109 | B2 | 3/2019 | Lepcha et al. |
| 10,230,600 | B2 | 3/2019 | Bhasin et al. |
| 10,749,762 | B2 | 8/2020 | Bellini, III et al. |
| 10,956,849 | B2 | 3/2021 | Wu et al. |
| 2018/0254996 | A1 | 9/2018 | Kairali et al. |
| 2020/0045519 | A1* | 2/2020 | Raleigh ............... H04M 15/765 |
| 2020/0089521 | A1 | 3/2020 | Padala et al. |
| 2021/0105317 | A1* | 4/2021 | Kona .................. H04L 43/0876 |
| 2021/0392185 | A1 | 12/2021 | Einkauf et al. |
| 2023/0020330 | A1* | 1/2023 | Schwerin ............... G06F 16/256 |
| 2023/0300086 | A1* | 9/2023 | Ivanov .................. H04L 47/762 709/226 |

* cited by examiner

*Primary Examiner* — Mohamed A. Wasel
*Assistant Examiner* — Jihad K Boustany
(74) *Attorney, Agent, or Firm* — Robert C. Kowert; Kowert, Hood, Munyon, Rankin & Goetzel, P.C.

(57) ABSTRACT

Based on analysis of a workload associated with a throttling key of a client request directed to a first service, a scale-out requirement of the throttling key is obtained at respective resource managers of a plurality of other services which are utilized by the first service to respond to client requests. The resource managers initiate, asynchronously with respect to one another, resource provisioning tasks at each of the other services to fulfill the scale-out requirement. A throttling limit associated with the throttling key is updated to a second throttling key after the resource provisioning tasks are completed by the resource managers, and the updated limit is used to determine whether to accept another client request associated with the throttling key.

20 Claims, 10 Drawing Sheets

AUTOMATED PROVISIONING TECHNIQUES FOR DISTRIBUTED APPLICATIONS WITH INDEPENDENT RESOURCE MANAGEMENT AT CONSTITUENT SERVICES

BACKGROUND

Programming and administering distributed applications and services is challenging, especially in scenarios in which a service-oriented architecture is employed. For a given distributed service, numerous auxiliary or lower-level services can be utilized in combination to fulfill a given type of customer request directed to the distributed service. In some cases, provisioning and administration of resources at a given lower-level service may be performed independently of similar tasks at other lower-level services.

Figure 1:
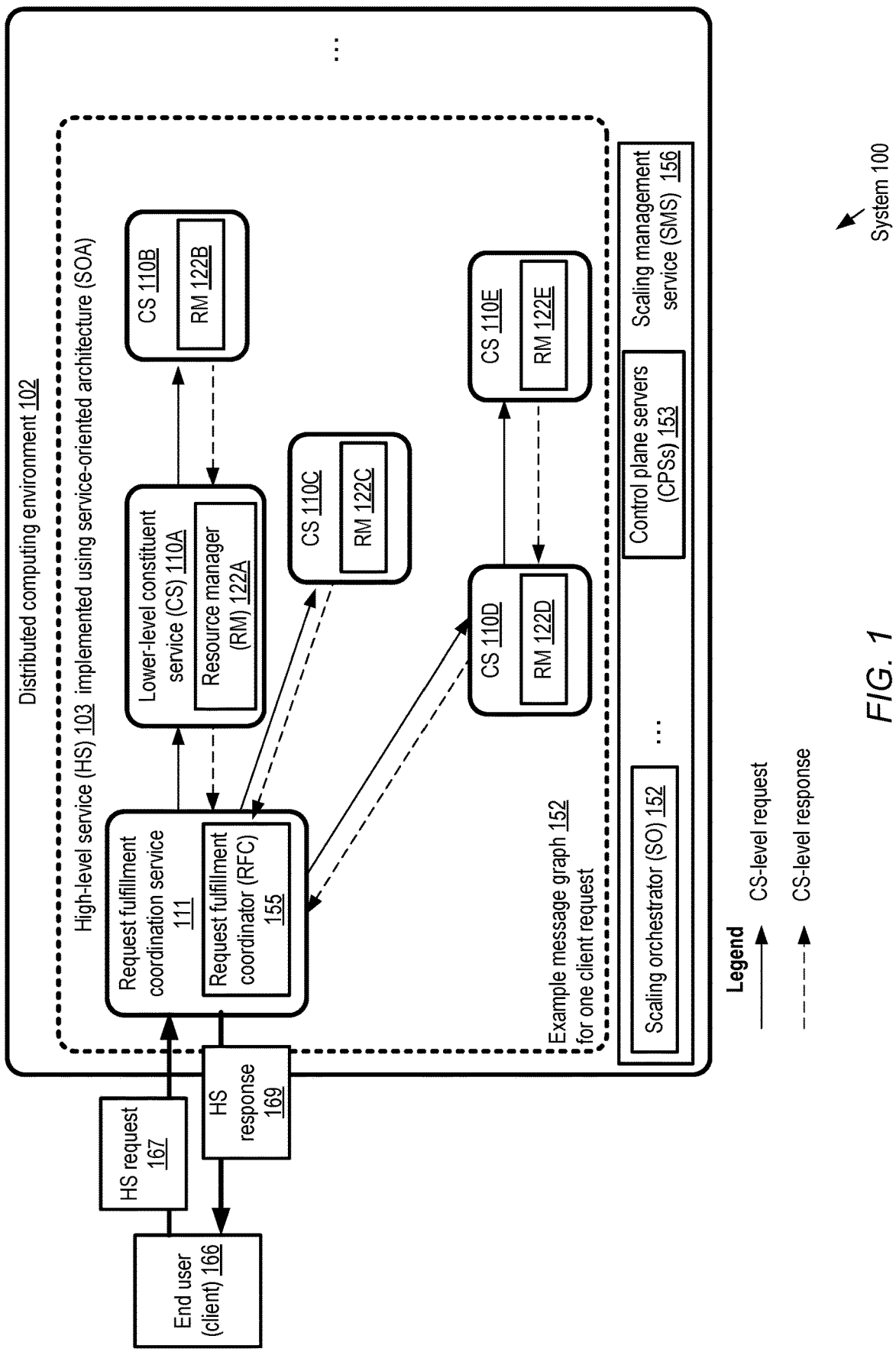
FIG. 1 illustrates an example system environment in which scaling orchestrators may be employed to manage automated provisioning at numerous constituent services of a higher-level service at a distributed computing environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for automating resource provisioning and scaling for certain types of distributed applications which utilize multiple, often independently-managed, auxiliary or lower-level services. Distributed applications, including many applications and higher-level network-accessible services executed using resources of cloud computing environments, are often implemented using a service-oriented architecture (SOA), in which the functionality of the application as a whole is divided among numerous asynchronously interacting and independently managed subcomponents referred to as network-accessible constituent services (CSs), auxiliary services (ASs), or micro-services of the applications. This approach has many benefits such as enabling small agile teams of software engineers to focus on enhancing features of the individual CSs, making updates more manageable, reducing the risks and impacts of individual failures, making debugging easier, and so on. To complete a given unit of work on behalf of a client or end user of the distributed application, a request fulfillment coordinator (RFC), which receives the client's work request, may send corresponding internal requests to various CSs (often via network messages corresponding to respective application programming interface (API) calls) and obtain responses to those internal requests. Some CSs in turn may send their own internal requests to other CSs. In some cases, hundreds or thousands of constituent services may be involved. The resources (e.g., virtual or physical computing resources, storage resources and the like) used for individual CSs may be managed (provisioned/acquired, monitored and/or released/freed) by respective resource managers (RMs) of the CSs. The RM of one CS may operate independently of the RMs of other CSs—e.g., resources may be acquired or released by one CS's RM without coordination or synchronization with RMs of other CSs.

In some cases, the distributed application or high-level service (HS) may in effect have at least two levels of customers. In one example scenario, an HS may be a dialog-driven application management service (DAMS), which can be used by one level of customers to develop, build and host chatbots or other kinds of dialog-driven applications or bots. Individual chatbots, which represent an example of customer-accessible application instances (CAIs) that can be hosted at an HS, may then be accessed by a second level of customer of the DAMS: end users that interact with the individual chatbots via voice, text, or other interaction modalities. Multi-tenant resources may in some cases be used for hosting CAIs of numerous customers. In order to ensure that different customers are able to obtain service responses with desired performance levels (e.g., latencies within desired limits with respect to chatbot responses to end user input), the RFCs may impose throttling limits on customer requests at selected granularities in various embodiments. In one simple example, the total number of outstanding network connections established for end users to communicate with a particular chatbot instance hosted at a DAMS within a time interval T may be kept below a connection throttling limit L1, so that if more than L1 requests for new connections are received during the time interval, the requests that would have led to exceeding the L1 limit may be rejected by the RFC. Throttling limits may be applied at granularities determined by keys referred to as throttling keys in various embodiments: for example, in the above example scenario in which the number of end-user connections of a given chatbot instance of a given chatbot owner is being throttled, the throttling key may be generated from the combination of the identifiers of the chatbot owner and the chatbot instance.

If the workload of end user requests (also referred to as client requests) directed at a given set of CAIs of an HS increases steadily, additional resources may need to be acquired at the CSs of that HS in order to accommodate at least some of the increased demand (e.g., by increasing throttling limits for at least some throttling keys whose workload is increasing) without rejecting more and more end user requests over time. Recall that the acquisition of resources at the CSs may be performed by independently-acting and asynchronously-operating RMs in at least some cases, which can complicate the problem of scaling up the HS's resources as a whole.

In some embodiments, one or more scalability orchestrators (SOs), each comprising some combination of software and hardware of one or more computing devices, may be implemented at distributed computing environments (e.g., within a scaling management service (SMS)) to help coordinate the scale-out tasks required from different CSs of an HS in a customizable manner. The terms "scale-out" or
"scale-up" may be used herein to refer to provisioning additional resource capacity to accommodate anticipated or actual increases in workload, while the terms "scale-in" or "scale-down" may be used to refer to freeing up resource capacity in view of anticipated or actual decreases in workload. Scale-out and scale-in operations may collectively be referred to as scaling operations.

Any of a number of criteria may be utilized in different embodiments to determine when and if an SO should initiate scale-out analysis tasks for a given throttling key. For example, in some embodiments, if more than N end user requests associated with a given throttling key are rejected during a given time interval (e.g., a minute) by an RFC, the scale-out analysis may be initiated at an SO as a result of a message received from the RFC. The scale-out analysis tasks may include, for example, computing the peak workload level of the HS with respect to a given throttling key (or a set of related throttling keys) over a longer time interval (e.g., a number of hours or days). If the peak computed peak workload satisfies a condition, a scale-out requirement for the throttling key(s) (e.g., indicating a proposed increase in a throttling limit) may be generated by the SO and made available via one or more communications to various RMs whose CSs are used for the end user requests associated with the throttling key.

The RMs may independently obtain the scale-out requirements, asynchronously with respect to one another, perform their own CS-specific computations (which may for example comprise applying formulas/transformations to the requested increase in throttling limit) to determine the particular set of resources needed at each CS, and initiate the acquisition or provisioning of that set of resources. As and when the acquisition of the required additional resources is completed at a given CS, the RM of that CS may notify the SO that the scale-out tasks at that CS have been completed. When the scale-out tasks for all the CSs are completed, the SO may inform the RFC of the HS that the proposed increased in throttling limit for the throttling key(s) under consideration can be made effective or "official". The RFC may then start using the new, higher throttling limit when deciding whether to accept or reject additional end user requests associated with the throttling key(s). For some complex distributed applications or HSs, hundreds or even thousands of CSs may be employed, so substantial amount of communication/coordination may be required to ensure that sufficient resources have been acquired by all the CSs before increasing throttling limits.

Any of a variety of communication techniques may be employed for conveying scale-out related information between RFCs, SOs and RMs in different embodiments. For example, message busses implementing a publish/subscribe interface may be used to provide scale-out requirements to RMs from SOs, a scale-out analysis request queue may be used to send requests for scale-out analysis from RFCs to SOs, and so on. In some embodiments, resources of a cloud provider network (such as virtual machines of a virtualized computing service (VCS)) may be used to implement SOs, RFCs and RMs.

In addition to coordinating scale-out or resource acquisition operations, SOs may also coordinate scale-in tasks (freeing up or releasing of resources of CSs) in some embodiments. Scale-in (comprising determining whether the throttling limits should be reduced for one or more throttling keys, reducing the limits for any such keys, and releasing resources that are therefore no longer required) may be performed iteratively in some embodiments, e.g., with a new scale-in iteration being initiated once every H hours. Note that triggering conditions for scale-in iterations, other than the time elapsed since the last iteration, may be employed in some embodiments: for example, a scale-in iteration may be started if the average CPU utilization at a set of computing resources being used for a given HS falls below a threshold during a selected time interval. The peak workload levels associated with various throttling keys over selected recent time intervals may be determined by an SO in a given scale-in iteration. If the peak workload levels associated with one or more of the throttling keys are below a predetermined threshold, scale-in requirements or requests indicating a reduction in throttling limits may be provided to CS RMs. In some embodiments, the reductions in the throttling limits may be made effective immediately, e.g., even before resources are freed at the CSSs; in other embodiments, the reductions in the throttling limits may not be applied until the resources have been freed. The RMs may obtain the scale-in requests and perform corresponding resource release tasks. Releasing unneeded resources may help improve (e.g., increase) average utilization levels at various resources used for the CSs. Various metrics pertaining to the throttling limits may be made available via programmatic interfaces of an SMS in some embodiments, e.g., to administrators of the HSs.

As one skilled in the art will appreciate in light of this disclosure, certain embodiments may be capable of achieving various advantages, including some or all of the following: (a) increasing the probability that preferred performance levels and request acceptance levels are obtained for various kind of end-user requests directed to distributed applications and services, (b) improving the resource utilization levels of resources employed for distributed applications and/or (c) improving the user experience of administrators of distributed applications that utilize multiple auxiliary services and/or are designed in accordance with a service-oriented architecture (SOA).

According to some embodiments, a system may include one or more computing devices. The computing devices may include instructions that upon execution at the computing devices receive a particular client request (e.g., a request from an end user of a customer-accessible application instance or CAI) at an RFC of a particular service of a distributed computing environment such as a cloud computing environment or provider network. In accordance with a service-oriented architecture the particular service may utilize a plurality of auxiliary services to fulfill client requests, including a first auxiliary service and a second auxiliary service. In at least some embodiments, resources of individual ones of the auxiliary services may be managed independently and asynchronously by respective RMs. In various embodiments, the RFC may determine, e.g., using a first throttling limit associated with a throttling key of the particular client request, that a scale-out analysis criterion has been satisfied. For example, the client request may comprise an API call for a new connection to be established, and the RFC may use the first throttling limit to determine whether the client request should be accepted and a new connection should be established. If the RFC discovers that the establishment of a new connection would cause the throttling limit to be violated, the request may be rejected in such an embodiment. The scale-out analysis criterion may indicate that scale-out analysis should be initiated if some number (e.g., one) such connection establishment request is rejected within a given time interval in one embodiment.

In response to determining that the scale-out analysis criterion has been met, the RFC may cause a corresponding scale-out analysis request associated with the throttling key to be obtained at a scaling orchestrator (SO) in some embodiments. One or more such scale-out analyses requests may be queued for the SO at any given time—e.g., one scale-out analysis request may be queued for throttling key TK1, another may be queued for a different throttling key TK2, and so on. The SO may consume queued scale-out analysis requests in the order in which they were queued in some embodiments. In other embodiments, the SO may process multiple scale-out analysis requests in parallel.

In response to obtaining the scale-out analysis request, the SO may obtain a peak workload metric (or some other workload statistic/metric) associated with the corresponding throttling key in various embodiments. For example, in some embodiments, the number of client requests associated with the throttling key over a selected time interval, including both accepted and rejected client requests, may be obtained by analyzing logs of client requests. The SO may then compare the peak workload level (comprising both accepted and rejected requests) with the current throttling limit of the throttling key, and determine whether a scale-out requirement for the throttling key should be provided to RMs of various CSs in various embodiments. In one implementation, the scale-out requirement may indicate a proposed increase in the throttling limit of the throttling key. Other parameters, e.g., parameters characterizing the kinds of operations that typically have to be performed on behalf of client requests associated with the throttling key, may also be included in the scale-out requirement in one embodiment. In some embodiments, workload metrics other than peak workload may be computed and used—e.g., average workload may be used, temporal trends (e.g., a rate of increase) in workload may be used, etc.

The different RMs of the CSs used may each obtain the scale-out requirement for the throttling key, and initiate their own CS-specific scale-out workflows in some embodiments. A set of resource provisioning tasks may be performed as part of such workflows, such as computing the specific number and types of resources that should be added to the resources of a given CS (which may differ from one CS to another for the same scale-out requirement) to increase the request processing capacity of the CS, submitting requests for that number of resources to the appropriate resource providers, verifying that the requested resources have been obtained/allocated for the CS, and so on. For example, in a scenario in which the resources to be provisioned comprise virtual machines or compute instances, the resource provider may comprise a virtualized computing service or VCS of a provider network. In some cases, the resource provider may take some time (e.g., a few minutes) to configure the requested resources; during such time intervals, the RMs may start provisioning tasks for other throttling keys if scale-out requests or requirements generated by an SO for other throttling keys happen to be pending. The resource provisioning tasks may be initiated and completed by one RM of one CS asynchronously and independently of the resource provisioning tasks of another RM of another CS in various embodiments. In at least some embodiments, a given CS may be used by several HSs, and scale-out operations may be performed at the CS for throttling keys of several different HSs at least partly in parallel. In one embodiment, an RM of a given CS may perform a scale-in workflow (in which resources are released for some throttling key K1) at about the same time as the RM performs a scale-out workflow for another throttling key K2, so some of the resources that had been acquired earlier to meet K1's throttling limit may be redirected or re-used for K2.

In at least some embodiments, the scaling requirement messages/requests generated by an SO may include one or more parameters pertaining to the HS requests submitted by the end users associated with a given throttling key, and such parameters may be used at the RMs of different CS to determine the amount of additional capacity (and therefore the number of resources of different types) needed for scale-out. For example, in one embodiment, a scale-out requirement SOR1 prepared by an SO may indicate (a) that a proposed increase in the number of outstanding connections that are to be permitted with a particular chatbot is N1 for end user interactions associated with a given throttling key K1 and (b) that in the previous X hours, the utterances of end users with key K1 have lasted on average S1 seconds, and (c) that in the previous X hours, the average number of end user utterances per session (i.e., the number of times that a response has to be prepared for the end user and presented to the end user) is U1. Given the parameters N1, S1 and U1, an RM RM1 of one CS CS1 which starts a scale-out workflow may use a CS1-specific function f1(N1, S1, U1) to compute the number and types of resources needed to be provisioned at CS1 for the scale-out requirement of K1. Another RM RM2 of a second CS CS2 may use a different (CS2-specific) function f2(N1, S1, U1) to compute the number and types of resources needed to be provisioned at CS2 for the same key K1. The numbers and/or types of resources provisioned at respective CSs for the same scale-out requirement message may thus in general differ in at least some embodiments. In some embodiments, the administrator of an HS (or an administrator of one or more CSs of an HS) may provide, e.g., via programmatic interfaces of an SMS at the time that an SO is being configured for an HS, an indication of the kinds of parameters whose values should be included in scale-out requirements by an SO, and the sources (e.g., log files maintained by RFCs) from which such values can be obtained by the SO. In some cases, RMs of different CSs may use respective subsets of the parameters—e.g., in the above example, RM1 of CS1 may use a function f1(N1, S1), while RM2 may use f2(N1, U1).

The SO may be informed by each of the RMs (using any of a variety of communication mechanisms) as and when that RM's resource provisioning tasks have been completed in various embodiments. After determining that all the RMs of all the CSs being used have completed their resource provisioning tasks associated with a throttling key for which a scale-out requirement had been generated by the SO, the SO may update the throttling limit for that key (e.g., the throttling limit may be increased to the proposed value that was indicated in the scale-out requirement). The RFC may obtain an indication of this change in throttling limit, and use the new throttling limit when determining whether to accept (or reject) an additional client request associated with the throttling request going forward.

Scale-outs for CSs used for a variety of distributed high-level services, which provide respective types of customer-accessible application instances (CAIs), may be organized and coordinated as described above by an SO in different embodiments. For example, the high-level service may comprise a dialog-driven application management service (DAMS) in one embodiment, and the CAIs may comprise respective chatbot instances. In another example, the high-level service may comprise a data storage service, and the CAIs may comprise respective data stores. In some cases, the high-level service may implement multi-layer web applications (e.g., with a webserver layer, an application server layer and a database layer), with each CAI comprising one instance of a particular multi-layer web application.

Resources may be scaled out at a variety of CSs of an HS in different embodiments. In the DAMS example, the CSs may include, among others, an automated speech recognition (ASR) service, a natural language understanding (NLU) service, a text-to-speech service, a request state information storage service, or a machine learning artifact selection service.

Throttling keys may be defined at various granularities in different embodiments, depending on the nature of the HS and the kinds of tasks performed there on behalf of end users. In one embodiment, identity information of the HS customer (such as a chatbot owner in the case of a DAMS) on whose behalf a CAI is created and hosted may be used to generate a throttling key, without taking individual CAI identifiers into account. The HS may store identity information of the owners of various CAIs hosted by the HS in such an embodiment; some CAI owners may own multiple CAIs, while others may own a single CAI. In one embodiment in which identity information of the CAI owner is used for the throttling key, end user request rates or the number of in-progress end-user requests associated with all of the CAIs (e.g., multiple chatbots) of that customer may be summed and taken into consideration when making acceptance decisions regarding new end user requests directed to any one of the CAIs. If accepting a new client request would cause the sum of in-progress client requests of all the CAIs of the owner to exceed the throttling limit in effect, the request may be rejected, regardless of the distribution of the in-progress requests among the different CAIs in such an embodiment. In other embodiments, throttling keys may be generated at a slightly finer granularity, and may take both the CAI owner identity and the CAI identity into account. In the latter scenario, only those client requests that are directed to the specific CAI indicated in the throttling key may be taken into consideration when making acceptance/rejection decisions for new client requests to that particular CAI—e.g., in one implementation, if the number of in-progress client requests directed to that CAI would exceed the throttling limit for the key if a new client request were accepted, the new client request would be rejected, regardless of in-progress requests at other CAIs of the same owner or different owners.

According to some embodiments, in which the HS is used for hosting various CAIs, the CAI owners may be classified according to any combination of several dimensions, and respective class-dependent scale-out (and/or scale-in) parameters (such as the changes to throttling limits which should be proposed and applied for scale-out and/or scale-in) may be used for each class of CAI owner. The CAI owners may be categorized, for example, based on one or more of: (a) a measure of complexity of client requests directed to their CAIs, (b) an arrival rate of client requests for their CAIs, (c) a temporal distribution of the client requests, (d) a geographical distribution of client requests or (e) a language used for client requests. Class-dependent computations, in which the class of the CAI owner is provided as a parameter to a function, may be used to select new throttling limits in such embodiments. Different deltas in throttling limits may thereby be chosen for the client requests directed to the CAIs of respective classes of CAI owners. By using class-dependent computations, the HS may be able to provide customized levels of service to the different categories of high-level services, and thereby support the desired levels of performance for end users of the CAIs of each CAI owner.

Scale-in operations for an HS may be performed iteratively in various embodiments. Scale-in iterations may be initiated based on a schedule in some embodiments, e.g., once every H hours. A given scale-in iteration may also involve the SO and the RMs. In the scale-in iteration, in some embodiments, a set of throttling keys may be identified as candidates for throttling limit reduction, e.g., based on computations of their respective peak workloads during selected time intervals. For individual ones of such candidate throttling keys, respective lowered throttling limits may be determined, and the RMs may perform the corresponding set of resource freeing or releasing tasks (since fewer resources may be required for lower throttling limits) at each of the CSs independently and asynchronously with respect to one another.

A variety of metrics associated with scale-out, scale-in, and throttling, may be collected and provided via programmatic interfaces (e.g., web-based consoles, graphical user interfaces, APIs, or command line tools) to clients of an SMS in some embodiments. Such metrics may, for example, indicate the changes to throttling limits for various throttling keys over time, the total measured client request rates over various time intervals, measured client request rejection rates as a function of time, elapsed times between determination that a scale-out analysis criterion has been met and the corresponding "official" update of a throttling limit (the time at which the new throttling limit takes effect for acceptance/rejection decisions for new end user requests), elapsed times between generation of scale-out requirements and the corresponding official updates of the throttling limits, and so on.

FIG. 1 illustrates an example system environment in which scaling orchestrators may be employed to manage automated resource provisioning at numerous constituent services of a higher-level service at a distributed computing environment, according to at least some embodiments. As shown, system 100 may include subcomponents of a high-level service (HS) 103 implemented according to a service-oriented architecture (SOA) at a distributed computing environment 102 such as a cloud provider network, as well as a scaling management service (SMS) 156. In accordance with SOA, the HS may be organized as a collection of auxiliary or lower-level services, referred to as constituent services (CSs), such as CS 110A, CS 110B, CS 110C, CS 110D and CS 110E, along with a request fulfillment coordination service 111. The request fulfillment coordination service 111 may comprise one or more request fulfillment coordinators (RFCs) such as RFC 155 which are responsible for receiving HS requests 167 from clients or end users 166 of HS, causing the operations/tasks required to fulfill the HS requests to be performed at various CSs 110, and in at least some cases providing HS responses 169 to the end users. In at least one embodiment, an RFC may also implement a portion of the business logic of the HS—that is, some of the computations needed to fulfill end user requests may be performed at the RFC, while other computations may be performed at the CSs.

For respective types of HS requests sent by clients, corresponding groups of internal messages may be transmitted among the subcomponents of HS 103 to perform the needed tasks. Example message graph 152 shows a set of messages transmitted for a particular HS request. In this graph, an RFC 155 may send a CS-level request to CS 110A. CS 110A may in turn send a CS-level request to CS 110B. A CS-level response from CS 110B may be received at CS 110A, and used to send a CS-level response to the RFC. RFC 155 may also send CS-level requests to CS 110C and CS 110D, and obtain corresponding CS-level responses. Before sending the CS-level response to the RFC, CS 110D may send its own CS-level request to CS 110E and obtain a corresponding CS-level response from CS 110E. In some cases, CS-level requests may be sent in parallel rather than sequentially: for example, the RFC may send CS-level requests to CS 110C and CS 110D without waiting for responses from any of the CSs. Different message graphs may be utilized for some client requests than for other client requests—e.g., for some classes of client requests, RFC 155 may not need to send a CS-level request to CS 110C, but may only send CS-level requests to CS 110A and CS 110D. Note that in some embodiments a given CS may be used by or for several different HSs. In one embodiment, a CS used by one HS may itself send requests to a second HS to complete its portion of work, and that HS may in utilize its own set of CSs; as such CSs may not necessarily be considered as entities at a lower level of a service hierarchy than HSs.

Individual ones of the CSs may be implemented using a respective set of resources (such as physical or virtualized computing devices, storage devices, and the like) and artifacts (such as machine learning models, scripts, or parameter files) in the depicted embodiment. The resources may be provisioned or acquired for a given CS by a respective resource manager (RM), such as RM 122A of CS 110A, RM 122B of CS 110B, RM 122C of CS 110C, RM 122D of CS 110D and RM 122E of CS 110E. The resources needed at a given CS may be obtained from a variety of resource sources by the RMs—e.g., virtualized computing resources may be obtained from a virtualized computing service of a cloud provider network by submitting programmatic requests for virtual machines, storage space may be obtained from a storage service of a cloud provider network by submitting programmatic requests, and so on. The RMs of the different CSs may operate independently and asynchronously with respect to one another in various embodiments—that is, a given RM may make decisions regarding resource acquisition and/or resource release (freeing up resources) at its CS without coordinating those decisions with RMS at other CSs, and also implement those decisions independently of other CSs. Each RM may, for example, have its own heuristics or rules to determine the amount of request processing capacity (e.g., the number of virtualized CPUs needed) that is required to perform various types of tasks at its CS corresponding to corresponding rates of CS-level requests.

For various HS requests 167 received at the RFC, a respective throttling key may be determined by the RFC in the depicted embodiment, and used to determine whether the request should be accepted (that is, whether CS-level requests to complete the tasks required for fulfilling the HS request should be sent to selected CSs) or rejected. The throttling keys may be used to subdivide the overall workload of the HS so that different groups of end-users can be treated fairly with respect to one another in various embodiments. A variety of techniques and factors may be used to determine or generate the throttling keys in different embodiments as discussed below in further detail. For example, in one embodiment, each client request may be directed to a particular customer-accessible application instance (CAI) (such as a respective chatbot or database instance) implemented at the HS on behalf of various CAI owners, and the throttling key may be computed based on the CAI's identifier and/or the identifier of the owner. For a given throttling key, a corresponding dynamically modifiable resource throttling limit may be stored at the HS in various embodiments. In one implementation, for example, the resource throttling limits may indicate the maximum number of outstanding network connections established for client requests associated with respective throttling keys. For example, for a throttling key K1, a resource throttling limit L1 connections may be used, while for a throttling key K2 a resource throttling limit L2 connections may be used (where L2 may differ from L1 at a given point in time).

In various embodiments, in accordance with the applicable throttling limit, the RFC may accept a given client request under the assumption that sufficient resources are available at the different CSs to fulfill the request with a targeted performance level (e.g., within a desired time limit). As such, in at least some embodiments, additional resources may have to be provisioned at some or all of the CSs in order to accommodate an increase in a throttling limit for a given throttling key. However, the number of additional resources needed for a given delta in a throttling limit, and/or the types of additional resources needed for a given delta in a throttling limit, may differ from one CS to another in various embodiments; the RM of each CS may have to make the determination as to how much additional request processing capacity should be acquired, and the numbers and types of additional resources that should be acquired. In the depicted embodiment, increasing the throttling limit for a given throttling key may be referred to as scaling out or scaling up the HS for that throttling key, while decreasing the throttling limit for a given throttling key may be referred to as scaling in or scaling down the HS for that throttling key. Different RMs may add different amounts of capacity to their CSs for a given scale-out requirement for a given throttling key in various embodiments.

In the embodiment depicted in FIG. 1, a scaling orchestrator (SO) 152 of SMS 156 may be configured to (a) perform an analysis, based on various types of triggering events, to determine whether a throttling limit for a given throttling key should be increased (or decreased) at the HS and (b) coordinate the acquisition or freeing of resources at the different CSs if and when a decision to change a throttling limit is made. The SMS may comprise a plurality of SOs, each of which may be assigned for managing scaling of respective HSs, e.g., by control plane servers (CPSs) 153 of the SMS. The CPSs may also perform other administrative tasks of the SMS such as provisioning resources for the SOs, monitoring the health status and responsiveness of the SOs, and so on in various embodiments. In some embodiments SOs, RFCs, RMs and CPSs may all be implemented using some combination of software and hardware at one or more computing devices.

The RFC 155 may cause the SO 152 to initiate a scale-out analysis (the analysis as to whether a throttling limit should be increased) in some embodiments. When a client request such as HS request 167 is received, the RFC may determine the throttling key associated with that request, and the current throttling limit for that key. In one embodiment, if accepting the client request would cause the current throttling limit to be exceeded (and the client request therefore has to be rejected), the RFC may determine that a scale-out analysis criterion has been satisfied, and cause a scale-out analysis request for the throttling key to be obtained at the SO 152 via a selected communication channel. In other embodiments, in addition to just determining whether a single newly-received request is rejected based on the current throttling limit, other factors may also be taken into account to determine whether a scale-out analysis should be initiated—e.g., the RFC may determine whether the total number of rejected requests for the same key over a selected time interval exceeds a threshold, whether a scale-out analysis was performed earlier for the same key and if so whether the time since that previous scale-out analysis exceeds a threshold, and so on.

The SO 152 may receive or obtain the scale-out analysis request for the throttling key, and determine a peak workload metric associated with the throttling key in the depicted embodiment. The peak workload metric may be determined in some implementations by computing a sum of (a) the rate of accepted requests associated with the throttling key over a selected time interval and (b) the rate of rejected requests associated with the throttling key over the selected time interval. In some embodiments, the time interval over which the peak workload is computed may begin when the SO starts its scale-out analysis; in other embodiments, the time interval may include some amount of time before the scale-out analysis is initiated. The duration of the measurement interval for computing the peak workload may be a tunable parameter of the system in various embodiments.

Depending at least in part on analysis of the peak workload metric (and in some cases on other factors such as a customer category associated with the throttling key), in some embodiments the SO may determine that a scale-out request is to be generated and caused to be obtained at various RMs of the CSs used at the HS. The scale-out request may, for example, indicate the throttling key, the current throttling limit for that throttling key, a proposed new throttling limit (which exceeds the current throttling limit), and/or various other parameters such as properties of the client requests associated with the throttling key. The scale-out request may be provided to the RMs using any of a variety of communication channels or techniques in different embodiments—for example, in one embodiment a message bus which supports a publish/subscribe model for messages may be used, in other embodiments a message queueing service of a provider network may be used, and so on.

Individual ones of the RMs 122 may obtain the scale-out requests in the depicted embodiment, e.g., at times of their choice. For example, RM 122A may obtain the scale-out request a time T1, RM 122B may obtain the scale-out request at a later time (T2+delta1), RM 122C may obtain the scale-out request at a time (T1+delta1−delta2), Rm 122D may obtain the scale-out request at a time (T1+delta1+delta3), and so on. Each RM may determine the particular set of resources that would be required to fulfill the scale-out request at its CS (e.g., to enable the CS to handle the increased throttling limit for that throttling key while maintaining desired performance levels for client requests associated with all throttling keys). The RM may then initiate a corresponding set of resource provisioning tasks to add the required request processing capacity to fulfill the scale-out request, and inform the SO when the resources have been provisioned. For example, based on a scale-out request SOR1, RM 122A may determine that N1 additional virtual CPUs should be provisioned at CS 110A, RM 122B may determine that N2 additional virtual CPUs and N3 additional gigabytes of storage should be provisioned at CS 110B, RM 122C may determine that N3 additional virtual CPUs and N4 additional gigabytes of storage should be provisioned at CS 110C, and so on.

After the SO 152 determines that all the RMs have completed their respective resource provisioning tasks, the current throttling limit for the throttling key for which the scale-out request was generated may be increased, e.g., to the proposed throttling limit indicated in the scale-out request in the depicted embodiment. The RFC 155 may obtain an indication of the change to the throttling limit, and the new throttling limit may be used by the RFC going forward to determine whether to accept or reject additional client requests.

In at least some embodiments, it may sometimes be the case that the current throttling limit in use for a particular throttling key is higher than the workload level of that throttling key requires. To avoid wasting resources at the CSs, a scale-in procedure may be implemented in some embodiments. In such a scale-in procedure, the SO may perform a scale-in analysis, in which peak workload levels (or other workload metrics) are identified for various throttling keys, and scale-in requests indicating reductions in throttling limits for one or more throttling keys are made available to the RMs. The RMs may then initiate resource freeing tasks, reducing the request processing capacity in line with the reduced throttling limits in the depicted embodiment. The SO may be informed by the RMs when they have freed up the resources. In at least some embodiments, the reduced throttling limits may be indicated to the RFC by the SO even before the resources have been freed at the CSs, and the RFC may start using the reduced throttling limits for making acceptance/rejection decisions for client requests as soon as the RFC obtains the reduced throttling limits. In other embodiments, the SO may inform the RFC about the reduction in a throttling limit for a given throttling key only after the resource capacity has been reduced based on the reduction at various CSs.

Figure 2:
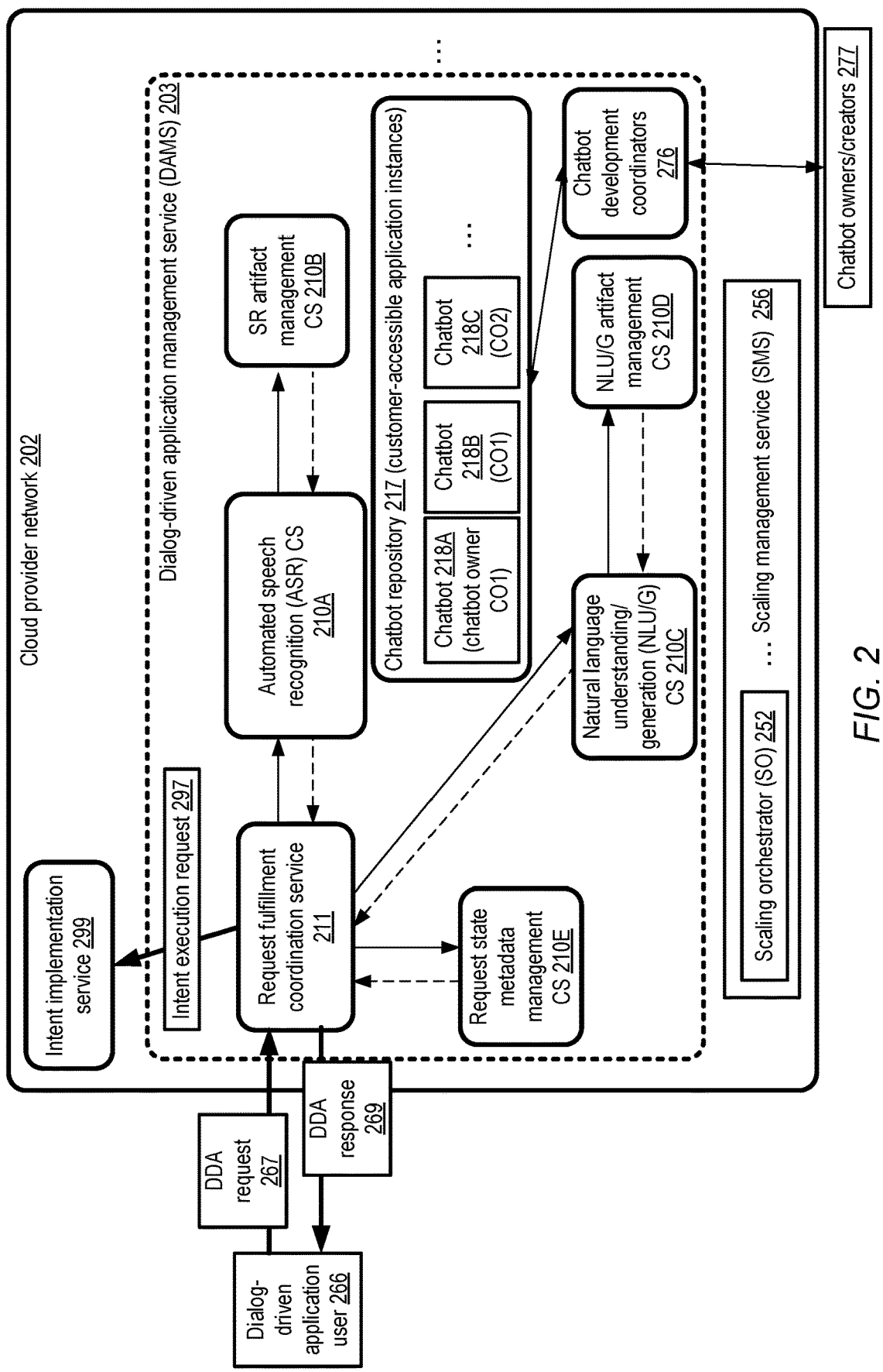
FIG. 2 illustrates an example use of scaling orchestrators at a dialog-driven application management service of a cloud provider network, according to at least some embodiments.
Figure 3:
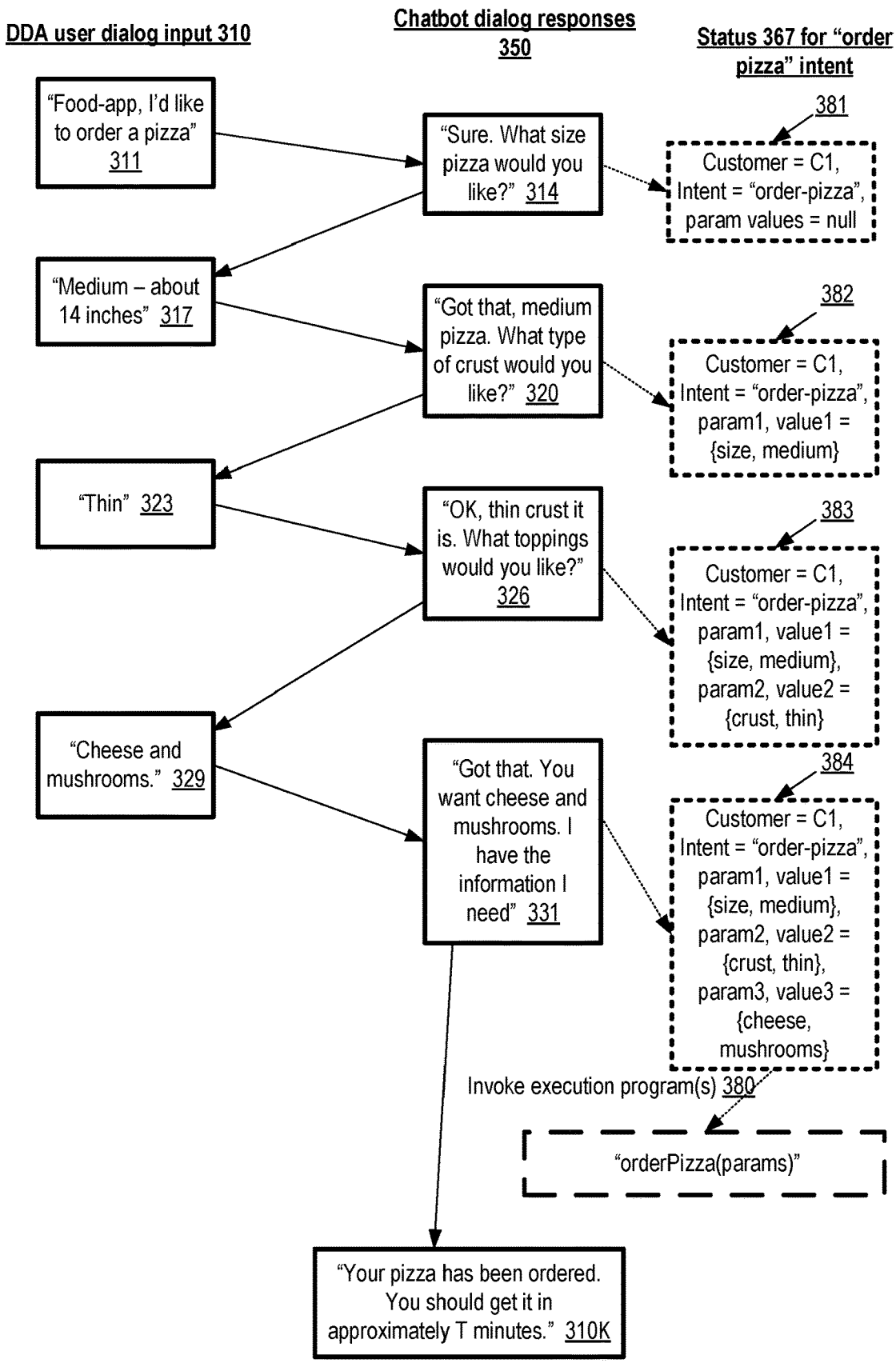
FIG. 3 illustrates an example set of interactions between and end user of a bot and a dialog-driven application management service, according to at least some embodiments.

FIG. 2 illustrates an example use of scaling orchestrators at a dialog-driven application management service of a cloud provider network, according to at least some embodiments. DAMS 203 of cloud provider network 202 may implement a service oriented architecture and represent a concrete example of the kind of high-level service (HS) discussed in the context of FIG. 1. DAMS 203 may be used, e.g., by a set of chatbot owners/creators 277 to generate and host a collection of chatbots in the depicted embodiment. Such chatbots may be employed, for example, to implement customer support tasks of an organization, to enable end users to order items from an e-retailer using voice commands, to provide answers to queries expressed in a conversational manner, and so on. The DAMS may implement a set of programmatic interfaces for simplifying the task of creating chatbots. Such interfaces may enable chatbot owners to specify a set of intents associated with tasks performed using a given chatbot, provide example utterances and parameter slots for various intents, and so on. The process of generating and storing various versions of chatbots may be orchestrated at the DAMS by a set of chatbot development managers 276 which may receive the input regarding intents/utterances/parameters from the chatbot owners/creators 277 and use the provided input to create the chatbots. Examples of utterances and associated parameters are shown in FIG. 3 and discussed below. Chatbot repository 217 may be used to store representations (e.g., executable programs) of the different chatbots, such as chatbots 218A and 218B of chatbot owner CO1, chatbot 218C of chatbot owner CO2, and so on. The chatbots 218 may represent one example of customer-accessible application instances (CAIs) which may be hosted and/or implemented at high-level services such as the DAMS in various embodiments. Other examples of CAIs may include data store instances, web application instances, and so on in different embodiments.

In the embodiment depicted in FIG. 2, a dialog-driven application user 266 may submit a dialog-driven application (DDA) request 267 via programmatic interfaces of the DAMS. The user's request may be directed to a particular chatbot, to which access may be provided via a Domain Name Service (DNS) name or IP (Internet Protocol) address. A message containing the DDA request may be received at an RFC of RFC service 211 of the DAMS. If the DDA request is accepted (which may be determined based on throttling limits associated with the targeted chatbot or the owner of the targeted chatbot), the RFC may cause respective messages to be obtained at several CSs of the DAMS to perform the requested tasks. The CSs used for chatbot requests may, for example, include an automated speech recognition (ASR) CS 210A, a speech recognition (SR) artifact management CS 210B, a natural language understanding/generation (NLU/G) CS 210C, an NLU/G artifact management CS 210D and a request state metadata management CS 210E in the example depicted in FIG. 2. The SR artifact management service may, for example, be responsible for providing the ASR CS access to a variety of speech recognition tools or machine learning models, while the NLU artifact management CS may be responsible for providing the NLU/G CS access to a variety of machine learning models used for interpreting or understanding the semantics of text generated from dialog utterances by the ASR CS. In some embodiments the NLU/G CS may also be used to generate utterances to be transmitted to the DDA user as part of a two-way dialog. The request state metadata management CS may store state information pertaining to various intents being fulfilled via dialog interactions in the depicted embodiment, and to provide input data for analytics tools that can be used to tune various parameters of the DAMS or of individual chatbots to improve end user experience.

After all the parameters needed to initiate a set of tasks for a given intent of a DDA user have been obtained (which may take several rounds of verbal, text and/or other types of interactions with the DDA user), the RFC may cause the tasks to be initiated in some cases by sending an intent execution request 297 to an intent implementation service 299 or some entity external to the DAMS itself. For example, if the chatbot in question is used for ordering food from a restaurant, after all the parameters of a given order have been determined at the DAMS, a request to prepare, package and transport the ordered set of food may be sent to a service which informs the relevant staff of the restaurant about the order. The RFC may also send one or more DDA responses 269 to the DDA user 266, e.g., to indicate that the requested tasks of the DDA request are underway or have been completed.

Throttling keys may for example be created for individual ones of the chatbots 218 in some embodiments, and for individual chatbot owners in other embodiments. For example, if throttling keys and associated throttling limits are associated with individual chatbots, an RFC implemented at request fulfillment coordination service may take only the requests directed at a single chatbot into account when making decisions as to whether a new DDA request directed at that chatbot (e.g., a request to establish a connection which would be used to convey intents of the end user) should be accepted or rejected. In contrast, if throttling keys that cover all the chatbots of a given chatbot owner are used, the requests directed at both chatbot 218A and chatbot 218B (which are both hosted for chatbot owner CO1) may be taken into consideration when making such decisions.

In the embodiment depicted in FIG. 2, the cloud provider network 202 may include an SMS 256. An SO 252 of the SMS may obtain an indication, e.g., from an RFC implemented at request fulfillment coordination service 211, to initiate a scale-out analysis with respect to one or more throttling keys. Using logic similar to that discussed in the context of FIG. 1, the SO may determine a peak workload metric associated with the throttling key(s) and use the peak workload metric to determine whether scale-out of resources at the CSs of the DAMS is warranted or not. If the SO decides that scale-out is to be performed, the SO may cause RMs of various CSs (such as ASR CS 210A, SR artifact management CS 210B, NLU/G CS 210C, NLU/G artifact management CS 210D, and request state metadata management CS 210E) to obtain scale-out requests for the throttling key (which may indicate an increase in the throttling limit for the key). The RMs, which may operate autonomously and asynchronously with respect to one another, may obtain the scale-out request, determine the respective set of resources needed to accommodate the proposed increase in the throttling limit, initiate resource provisioning tasks, and inform the SO when the resource provisioning tasks are complete. After all the RMs have finished their provisioning tasks, the SO may update the throttling limit for the key from its current value to the proposed value, and inform the RFC about the new throttling limit. The RFC may then start using the new throttling limit for making decisions as to accept or reject additional DDA requests. A scale-in procedure similar to that discussed in the context of FIG. 1 may also be conducted collectively by the SO, the RMs and the RFC in some embodiments.

FIG. 3 illustrates an example set of interactions between and end user of a bot and a dialog-driven application management service, according to at least some embodiments. In the depicted embodiment, an end user or customer verbally interacts with a meal ordering chatbot, which has been developed and deployed using a DAMS similar in functionality to DAMS 203 of FIG. 2, to order a pizza. Examples of the customer's verbal statements are shown in the left part of FIG. 3, labeled "DDA user dialog input 310". Examples of the chatbot's responses corresponding to the end user input are shown under the label "Chatbot dialog responses 350". As the interactions proceed, the chatbot in effect fills out, with the help of various CSs of the kind shown in FIG. 2, a data structure with intent parameter values, shown in the rightmost part of FIG. 3 under the label "Intent status 367 for "order pizza" intent".

The user may try to initiate a conversation or dialog with the chatbot with the utterance "Food-app, I'd like to order a pizza" 311 in the depicted example. An RFC of the DAMS may decide, based on a current throttling key associated with the food-ordering chatbot, that the user's request should be accepted in the depicted example scenario, and a connection may be established for the end user to provide input about their request. In some embodiments, a request for the connection may be sent, e.g., by a client-side component of the DAMS running at a cell phone or similar user device, before the user submits the first utterance; that is, utterances may be initiated only after the connection request is accepted. The introductory term "Food-app" may be considered a "wake word" or a "wake phrase" in some embodiments—a signal to distinguish the interaction with the meal-ordering chatbot from other conversations that may be detected by the audio sensor(s) or microphone(s) being used for the interactions with the chatbot. ASR/NLU CSs may be used at the DAMS to identify the words spoken by the customer, and to ascertain that a pizza is to be ordered. A conversational response "Sure. What size pizza would you like?" 314 may be generated as part of the chatbot's dialog-flow (e.g., using a natural language generation CS) and provided to the user via a speaker component of the end user device being used. In addition, the DAMS may instantiate an intent called "order-pizza", store an indication of the identity of the user, and an indication that no parameter values have yet been determined for the intent (as indicated by "param values=null") in intent status 381. The owner of the chatbot may have indicated, via the programmatic interfaces used for creating the chatbot at the DAMS, that among the parameters associated with the intent, the first one whose value should be ascertained is "size"; as a result, the phrase "what size pizza would you like" may be included in the response 314.

The end user may respond with the statement "Medium—about 14 inches" 317 in the depicted example. Note that the "about 14 inches" portion of the statement 317 may be atypical and may not be part of the dialog expected by the chatbot (e.g., if the chatbot is designed with three pizza size indicators "large", "medium" and "small" expected to be used in the dialog). However, the NLU algorithms used for the chatbot may be able to determine, based on analyzing the statement 317, that (a) a "medium" pizza is desired by the user, and (b) the user believes that the medium pizza is about 14 inches in diameter. Assuming that the diameter of the medium pizza is in fact supposed to be approximately 14 inches, the size parameter of the intent may be filled with the value "medium", as indicated in status 382. It is noted that in various embodiments, the chatbot may be designed to respond appropriately to ambiguous or incorrect statements made by the end user. For example, consider a scenario in which the expected set of choices "large", "medium" and "small" for pizza sizes correspond to diameters 18 inches, 14 inches and 10 inches respectively. If the end user responds to the question about desired pizza size by saying "Medium—about 20 inches", "Medium—about 10 inches", or even "Medium—about 16 inches", the chatbot may respond (with the help of ASR and NLU/G CSs) with a clarifying follow-up response roughly equivalent to the following in some embodiments—"I'm sorry, I didn't quite understand. Our medium pizzas are approximately 14 inches in diameter, our large pizzas are about 18 inches, and our small pizzas are about 10 inches. Which size would you prefer?" The management of at least some ambiguous/incorrect end user statements may also be handled without requiring the chatbot owner to provide source code to the DAMS in some embodiments—for example, the word strings corresponding to the clarifying follow-up response may be provided by the owner, and the conditions under which the clarifying follow-up response is to be generated may be indicated by the owner via the programmatic interfaces of the DAMS.

The chatbot owner may have indicated, at build time, that after a value for the pizza size has been determined, the next two parameters for which values are to be obtained from the end user are crust type and toppings. Accordingly, the application may generate the response 320, comprising "Got that, medium pizza. What type of crust would you like?" The end user may respond with a single-word answer "Thin" 323, which would enable the crust parameter value to be set as indicated in intent status 383. After the crust choice has been determined, the application may request the customer to specify toppings, e.g., using the conversational response 326: "OK, thin crust it is. What toppings would you like?" The customer may respond with a list of toppings 329, enabling the toppings parameter values to be set, as indicated in status 383.

After values for all the required parameters have been ascertained, the chatbot may indicate that no more input is needed, e.g., by causing a statement "Got that. You want cheese and mushrooms. I have the information I need" 331 to be generated based on status 384. (The example assumes that payment information is not required—for example, a credit card that the end user has registered with the application may be used by default.) A fulfillment program ("orderPizza(params)") may be invoked by the chatbot to initiate the task corresponding to the intent whose parameters have ben populated, as indicated by arrow 380. After the fulfillment program is successfully invoked, in some embodiments a final statement confirming the task initiation may be generated for the end user.

As more and more orders for food are directed to the food ordering chatbot, the request processing capacity needed at the various CSs used for processing the orders may have to be increased (assuming that the chatbot owner wishes to accept the increased workload). In embodiments in which the CSs each have respective RMs operating independently of one another, an SO may be used to coordinate the process of scaling out (or scaling in) resources at all the CSs involved in processing end user requests directed to the chatbot, using techniques similar to those discussed above.

Figure 4:
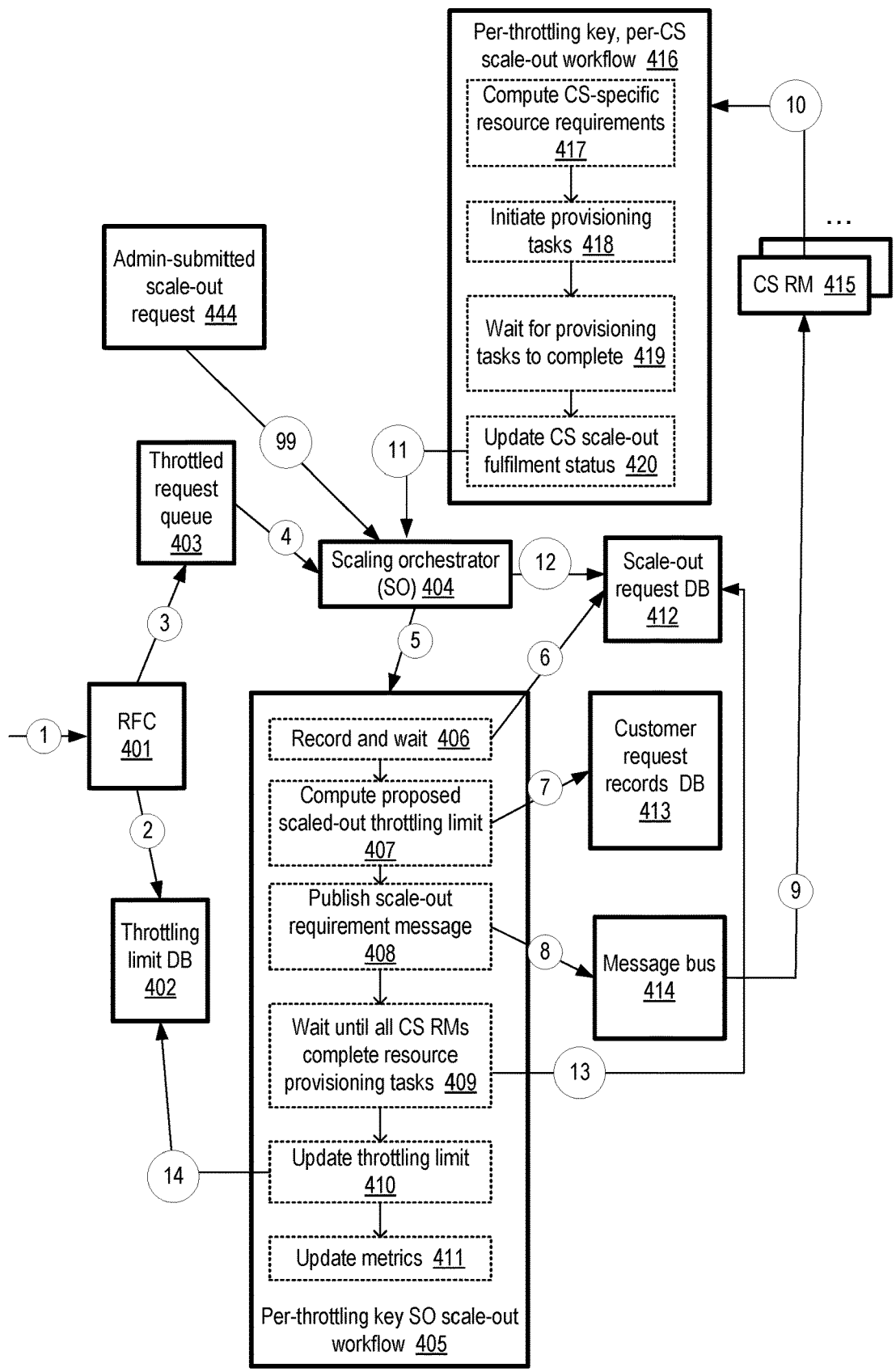
FIG. 4 illustrates example operations which may be performed to scale out resources which are acquired independently by respective resource managers of numerous constituent services of a higher-level service, according to at least some embodiments.

FIG. 4 illustrates example operations which may be performed to scale out resources which are acquired independently by respective resource managers of numerous constituent services of a higher-level service, according to at least some embodiments. An RFC of the higher-level service (HS), similar in features and functionality to the RFC 155 shown in FIG. 1, may receive a request from an end user of the HS, as indicated by the arrow labeled 1. The RFC 401 may construct or determine a throttling key K1 corresponding to the request, and look up a current value of a throttling limit L1 for that throttling key K1 within a throttling limit database (DB) 402, as indicated by the arrow labeled 2.

If the RFC determines, based on the current throttling limit L1, that the newly-received request should be rejected, a record indicating that the request has been rejected may be added to a throttled request queue 403 in the depicted embodiment (indicated by the arrow labeled 3). Such a record may serve as a scale-out analysis request of the kind discussed earlier. As indicated by the arrow labeled 4, a scaling orchestrator (SO) 404 assigned to the HS may retrieve the record of the rejection from the throttled request queue, and start implementation (indicated by the arrow labeled 5) of a per-throttling key SO scale-out workflow 405 for key K1 in the depicted embodiment.

In a first stage of the workflow 405, labeled "Record and wait" 406, the SO 404 may cause a record, indicating that a scale-out request is to be generated for the throttling key K1, to be stored (as indicated by the arrow labeled 6) within a scale-out request database 412 in the depicted embodiment. The SOS may then wait for a pre-determined amount of time T1 to compute a peak workload metric of requests with key K1. During this time interval, additional end user requests associated with K1 may be received at the RFC and recorded within customer request records database 413, and it may sometimes be the case that existing connections used for user request with key K1 are closed (e.g., due to completion of tasks requested by an end user at the HS). Some of the additional end user requests may be rejected, while others may be accepted. An additional request may be rejected if accepting it would cause the current throttling limit L1 to be exceeded, while an additional request may be accepted if accepting the new request would not cause L1 to be exceeded. A peak workload metric for end user requests associated with K1 may be computed by the SO based at least in part on a sum of (a) the number or rate of accepted requests for K1 during the selected time interval T1 (obtained from customer request DB 413 as indicated by the arrow labeled 7) and (b) the number or rate of rejected requests for K1 during the selected time interval T1 (e.g., also obtained from customer request DB) in the depicted embodiment. The SO 404 may use the peak workload metric as an input to a formula used to compute a proposed scaled-out throttling limit 407 for K1 in the depicted embodiment. The proposed scaled-out throttling limit may be based on factors (in addition to the peak workload metric) such as a customer category to which the end-user request is mapped, oversubscription parameters used for the HS for certain types of resources, and so on in some embodiments.

The SOS may publish a scale-out requirement message 408 (which may also be referred to as a scale-out request) to message bus 414 in the depicted embodiment, as indicated by the arrow labeled 8. The scale-out requirement message may indicate the key K1, the current throttling limit L1, a proposed increased or scaled-out throttling limit L2 and/or other parameters (such as one or more properties of the end user requests associated with the throttling key, which may be useful for some RMs to translate the throttling limit L2 into specific per-CS capacity requirements increases). In an embodiment in which the HS is a DAMS at which chatbots of the kind introduced in the context of FIG. 2 are hosted, statistics of the duration of end user utterances may be included in the scale-out requirement message or request, for example; such duration information may be required for some ASR or NLU/G CS RMs to decide how much additional resource capacity should be added. The message bus 414 may support an asynchronous publish/subscribe model for message transmission—e.g., messages may be published on the bus by registered publishers such as the SO, and the published messages may be read by registered subscribers at times chosen by the subscribers. The RMs 415 of various CSs used at the HS to fulfill end user requests for at least the throttling key K1 may subscribe to the message bus. After publishing the scale-out requirement to the message bus, the SO may wait until all CS RMs complete resource provisioning tasks for the scale-out requirement to be fulfilled in the depicted embodiment, as shown in element 409.

The CS RMs 415 may access the scale-out requirement message published by the SO (as indicated by the arrow labeled 9), e.g., asynchronously with respect to one another, in the depicted embodiment. When a given CS RM 415 retrieves the scale-out requirement message, the RM may initiate a per-throttling key, per-CS scale-out workflow 416 in the depicted embodiment (as indicated by the arrow labeled 10). In a first stage of this per-CS workflow, the RM may compute CS-specific resource requirements 417 based at least in part on the contents of the scale-out requirements message. Different amounts of additional resource capacity may be needed at respective CSs to accommodate a given increase in throttling limit for K1 in some embodiments, and the RMs may be responsible for computing the additional resource capacity needs for their CSs, as well as for translating the delta in additional resource capacity into a count of additional resources. For example, one RM may determine that for its CS, 8 additional virtual CPUs are needed, and that two compute instances (each providing 4 virtual CPUs) of a cloud provider network's virtualized computing service should be provisioned. Another RM may determine that for its CS, 10 additional virtual CPUs are needed, and that this may in turn require three compute instances (each providing 4 virtual CPUs). Each RM may initiate provisioning tasks 418 for its CS to be able to fulfill the scale-out requirement, and wait for the provisioning tasks to be completed 419 (e.g., wait for a virtualized computing service to indicate that the requested number of compute instances have been set up and successfully activated). The RM may then update the CS scale-out fulfillment status 420, e.g., by sending a message to the SO 404 in the depicted embodiment. The SO may modify the record of the scale-out request in database 412 to indicate that a particular RM has added capacity needed for the scale-out request, as indicated by the arrow labeled 12.

Eventually, all the RMs may complete their respective provisioning tasks, and an indication that this has occurred may be stored in the scale-out request database 412 by the SO (arrow 13). The throttling limit L1 for K1 may then be updated to the proposed value L2 (element 410) and the new value may be stored in throttling limit database 402 in the depicted embodiment, as indicated by arrow 14. The RFC 401 may then start using the new throttling limit L2 for making decisions regarding acceptance/rejection of additional end user requests. Metrics associated with the scale-out, such as the old and new throttling limits and the time it took to complete the scale-out may be stored, e.g., in a metadata store of the HS or the SMS in various embodiments, as indicated by element 411 of workflow 405. In some embodiments, an administrator of the HS may submit a scale-out request 444 (indicating, for example, a key and a proposed increase to the throttling limit for that key) to an SO, as indicated by arrow 99. The SO may then perform portions of the workflow 405 (e.g., starting with publishing a scale-out requirement message corresponding to the administrator-submitted request), and the RMs may perform the corresponding per-CS scale-out workflows 416. In some embodiments, aspects of the scale-out related operations performed by SOs, RMs and RFCs may differ from those shown in FIG. 4. For example, a communication channel other than a publish/subscribe message bus may be used in one embodiment.

Figure 5:
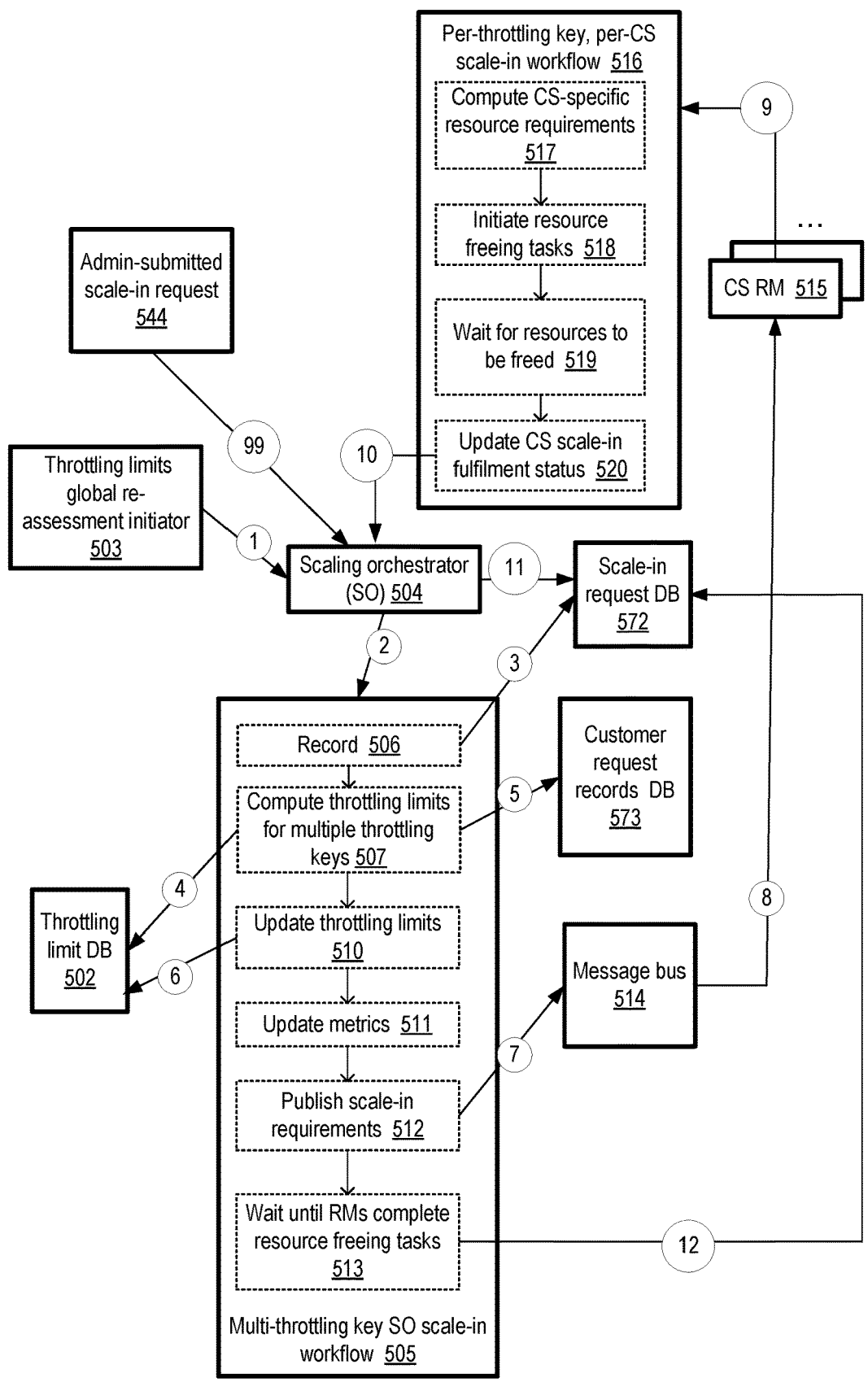
FIG. 5 illustrates example operations which may be performed to scale in resources which are freed independently by respective resource managers of numerous constituent services of a higher-level service, according to at least some embodiments.

FIG. 5 illustrates example operations which may be performed to scale in resources which are freed independently by respective resource managers of numerous constituent services of a higher-level service, according to at least some embodiments. In the scale-out example shown in FIG. 4, a scale-out assessment request was triggered by the arrival of a new end user request associated with a particular throttling key. In contrast, for scale in, global re-assessments (unrelated to the arrival of any specific end user request) may be conducted for throttling limits associated with various throttling keys in use at an HS in the depicted embodiment. A throttling limits global re-assessment initiator 503 may send a message to an SO 504 to start a scale-in iteration, as indicated by the arrow labeled 1 in FIG. 5. The global re-assessment may be initiated, for example, every H hours or every M minutes in some embodiments, in accordance with a schedule determined at an SMS of the kind described above (or obtained at the SMS from an administrator of an HS for which automated scale-in is desired). As part of a given scale-in iteration, the SO may initiate a multi-throttling key SO scale-in workflow 505 in response to the message, as indicated by the arrow labeled 2. A set of throttling keys whose workload level is to be analyzed to determine if some resources should be freed may be identified as candidates for scale-in or throttling limit reduction by the SO in various embodiments. In some embodiments, the analysis may be performed for all the throttling keys in use at the HS (that is, all the throttling keys, rather than a subset, may be identified as candidates for throttling limit reduction).

As part of workflow 505, the SO may store a record 506 of a global scale-in request in a scale-in request database 572 in the depicted embodiment, as indicated by the arrow labeled 3. This record may list all the candidate throttling keys being considered for scale-in in some embodiments. In other embodiments, records of respective scale-in requests for each throttling key may be generated and stored in the scale-in request database. In one embodiment, if a scale-out request for a given key is currently being processed (as may be detected by the SO from the scale-out request database 412 of FIG. 4) scale-in operations for that key may not be performed—that is, concurrent or temporally overlapping scale-in and scale-out workflows for the same throttling key may be prohibited.

The SO may access a throttling limit database 502 to determine the current throttling limits for various keys, as indicated by the arrow labeled 4. Based on analysis of records of customer requests in customer requests database 573 (as indicated by arrow 5), new (lowered) throttling limits may be computed by the SO for one or more throttling keys (as indicated in element 507 of the workflow). In one embodiment, a new throttling limit may be obtained using a formula to which the peak workload level over a selected time interval (e.g., a time interval starting M minutes before the start of the workflow 505, and ending at the time that the workflow started) for a given key is provided as input. Note that one or more of the throttling keys for which the analysis is conducted may not satisfy a condition for reducing/freeing resources, as their peak arrival rates may be close to their current throttling limits.

If the analysis of the workload reveals that at least some throttling limits can be reduced (e.g., because the peak workloads of the corresponding keys did not exceed, or come close to exceeding, the current throttling limits), the amount by which the throttling limits should be decreased may be computed by the SO, and the throttling limits may be updated accordingly (element 510). The updated reduced throttling limits may be stored in the throttling limit database as indicated by arrow 6. The RFC (not shown in FIG. 5) of the HS may start using the updated limits immediately in some embodiments, as there may be no need to wait for the resources to be freed to match the updated limits. In other embodiments, a different approach may be employed, in which the updated throttling limits may not be stored in the database 502 until the SO has confirmed that the resources have been freed based on the proposed reduction in the throttling limit.

Various types of metrics pertaining to the scale-in workflow (such as the old and updated throttling limits, the peak workloads which were used for the decision to reduce the throttling limit, etc.) may be stored in the depicted embodiment, as indicated in element 511. One or more scale-in requirements messages (comprising the old and new throttling limits and/or various other parameters similar to those discussed in the context of scale-out requirements messages of FIG. 4) may be published (element 512) to a message bus 514 to which the RMs of the CSs used at the HS have registered as subscribers in the depicted embodiment, as indicated by the arrow labeled 7.

The CS RMs 515 of the HS may obtain the scale-in requirement messages (arrow 8) asynchronously with respect to each other in the depicted embodiment. Each RM may then initiate a per-throttling key, per-CS scale-in workflow 516 for each throttling key for which scale-in is required (arrow 9). In the workflow 516, CS-specific resource requirements may be computed based on the information included in the scale-in request (element 517), and resource freeing tasks corresponding to the reduction in the throttling limit may be conducted (element 518). After the resources have been successfully freed, as indicated in element 519, the scale-in fulfillment status for the throttling key may be updated (element 520), e.g., by sending a message to the SO (indicated by the arrow labeled 10) in the depicted embodiment. As the messages indicating resource reduction at each CS for each key are obtained, the SO may update the status of the scale-in request in database 572 (as indicated by the arrow labeled 11). After all the RMs have completed their resource freeing tasks for all the throttling keys (as determined in element 513), an indication that the scale-in operations corresponding to the current global re-assessment iteration have succeeded may be stored in the scale-in request database, as indicated by the arrow labeled 12. In some embodiments, an administrator-submitted scale-in request 544 may be received by the SO (indicated by the arrow labeled 99), and this may trigger the execution of the workflows 505 and 516. In some embodiments, aspects of the scale-in related operations performed by SOs, RMs and RFCs may differ from those shown in FIG. 5. In one embodiment, for example, scale-in operations may be initiated separately for individual throttling keys, instead of performing analysis with respect to multiple throttling keys in scale-in iterations as shown in FIG. 5. Such a per-throttling key workflow may, for example, be initiated based on a determination that a total request rate for the throttling key over a recent time interval is below a selected fraction of the current throttling limit for the throttling key, based on resource utilization data of the various CSs, and/or based on other factors.

Figure 6:
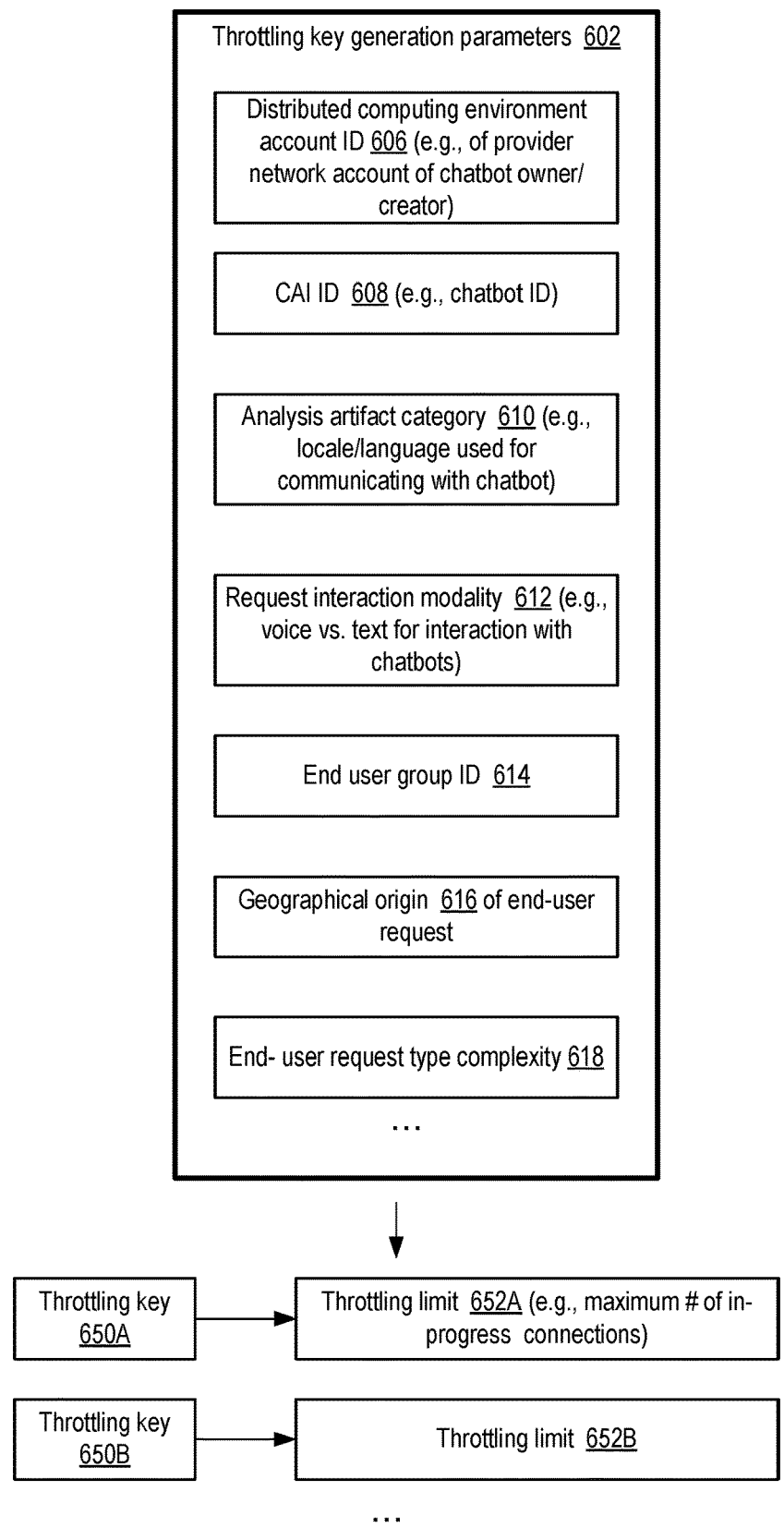
FIG. 6 illustrates example parameters which may be used to generate throttling keys used for resource management at a distributed service, according to at least some embodiments.

FIG. 6 illustrates example parameters which may be used to generate throttling keys used for resource management at a distributed service, according to at least some embodiments. Throttling key generation parameters 602 may include, among others, a distributed computing environment account ID 606 in some embodiments. For example, in scenario in which the distributed high-level service (such as a DAMS of the kind shown in FIG. 2) is implemented at a cloud provider network, the account identifier of the owner/developer on whose behalf the chatbot to which an end user request is directed may be use as one of the elements contributing to the throttling key.

In at least some embodiments in which the HS is used to host numerous customer-accessible application instances (such as chatbots 218 of FIG. 2), the identifier of the particular CAI to which an end user request is directed may be used as a parameter when generating the throttling key. Consider a scenario in which a chatbot owner CO1 uses a DAMS similar to DAMS 203 to host 2 chatbots CB1 and CB2. Identity information (e.g., a customer account ID such as "Cust12123") of the chatbot owners, as well as identifiers of the chatbots themselves (e.g., user-friendly names such as "Chatbot-A" and "Chatbot-B", which may have been selected by the chatbot owners) may be stored at the DAMS. If the throttling key definition takes only chatbot owners (or more generally, CAI owners) into account, a single throttling key (e.g., "key.Cust12123") may apply to end user requests directed to both CB1 and CB2. In contrast, if the throttling key definition takes the identifiers of the CAI owners and the identifiers of the CAIs into account, a respective throttling key (e.g., "key.Cust12123.CB1" or "key.Cust12123.CB2") may be applied to end user requests directed to each of the chatbots CB1 and CB2, thereby achieving a finer granularity of control with respect to scale-out and scale-in operations.

In some cases, the end user requests for which throttling keys are generated may be classified based on the types of analysis artifacts (such as machine learning models) that are used to fulfill the requests, and the analysis artifact category 610 may be used to generate a throttling key. For example, in the DAMS chatbot example, the locale or language used for interactions with the chatbot may drive the analysis artifacts used for fulfilling the end user requests (e.g., interactions in German may require the use of a different NLU or ASR model than interactions in English), and the different types of analysis artifacts may in turn have respective resource requirements. The throttling key may be generated based at least in part on the analysis artifact category in such embodiments.

In some embodiments, interactions between end users and the HS may utilize any of several modalities: for example, interactions with a chatbot may be done via voice, text and/or DTMF (dual-tone multi-frequency) signals. The particular request interaction modality 612 being used may influence the amount of processing capacity required (e.g., it may take fewer CPU cycles to analyze a text communication than a voiced utterance), so throttling keys may take the modality into account in such embodiments.

According to some embodiments, the end users of an HS may be classified into groups based on a variety of factors (e.g., how frequently the end user interacts with the HS, the kinds of tasks the end user usually requests, and so on), and end user group IDs 614 may be used to generate the throttling key associated with a given end user request. In one embodiment, the geographical origin 616 of the end-user request may be used to determine the throttling key—e.g., because respective sets of computing resources may be set aside at CSs to serve requests from respective geographical regions. In some embodiments, an estimate of the end-user request type complexity 618 may be generated and utilized to generate a throttling key. In some implementations, each of the factors that are to be used in combination for generating the throttling key (such as throttling keys 650A or 650B) corresponding to a given end-user request submitted to an HS may be converted to a digital representation or format, and the various digital representations may be concatenated (or transformed using a multi-parameter hash function or similar transformation function) to generate the throttling key. For each throttling key, a respective throttling limit may be in effect at any given point in time in various embodiments—e.g., throttling limit 652A (indicating a maximum number of in-progress connections for client requests) may be in effect for throttling key 650A, while throttling limit 652B may be in effect for throttling ley 650B. One or more of the parameters shown in FIG. 6 may not be used to generate throttling keys in some embodiments, and at least some parameters other than those shown in FIG. 6 may be employed in one embodiment.

Figure 7:
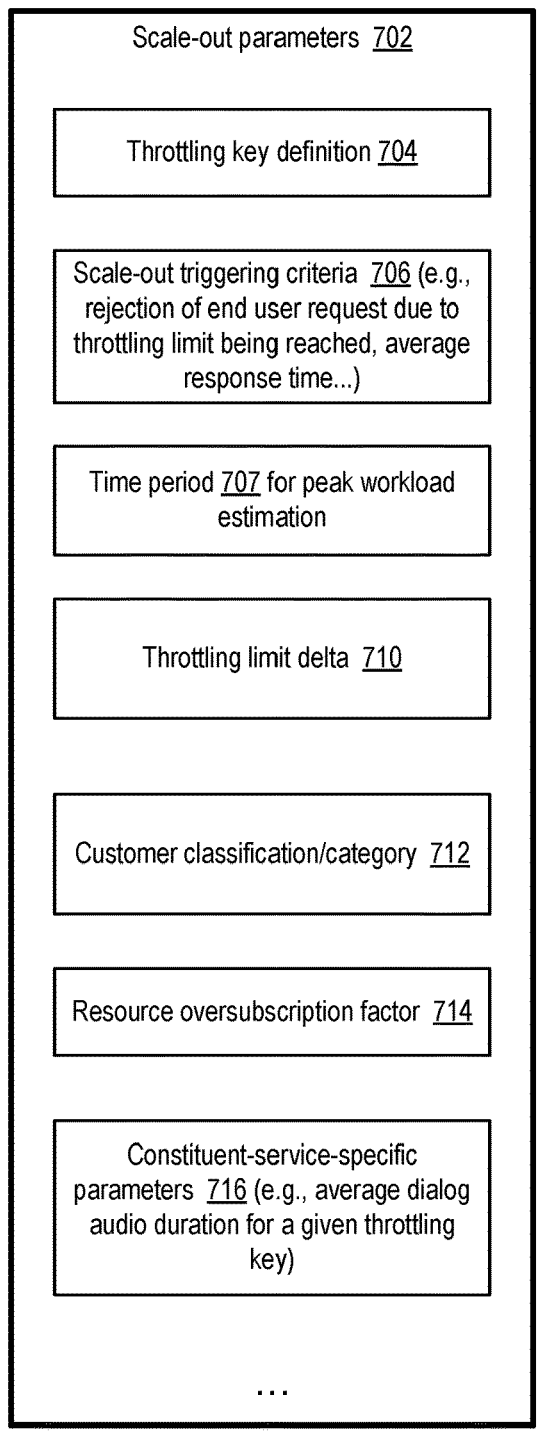
FIG. 7 illustrates example scale-out parameters for distributed services comprising numerous constituent services, according to at least some embodiments.

FIG. 7 illustrates example scale-out parameters for distributed services comprising numerous constituent services, according to at least some embodiments. Values for parameters such as those shown in FIG. 7 may be selected by administrators of the distributed high-level services, and/or by customers of the services, and used by RFCs, SOs, and RMs to perform their scale-out related tasks in various embodiments. Values of a subset of the parameters may, for example, be provided via programmatic interfaces to the HS and/or to an SMS. Scale-out parameters 702 may include a throttling key definition 704, which determines the granularity at which scale-out tasks are performed. The throttling key definition 704 may in effect indicate which specific combination of throttling key generation parameters such as those shown in FIG. 6 should be used to determine or compute a throttling key.

Any of a variety of scale-out triggering criteria 706 may be employed in different embodiments. In some embodiments, as indicated in FIG. 4, a rejection of an end user request due to reaching the current throttling limit may trigger a scale-out analysis (and potentially a corresponding set of workflows of the SO and the RMs) for the corresponding throttling key. In other embodiments, instead of triggering a scale-out analysis based on a single rejection, a threshold number of rejections (associated with the same throttling key) within a selected duration (where the duration itself is another scale-out parameter) may be required to initiate scale-out analysis. In one embodiment, the average response time for end user requests associated with a throttling key over some time interval may be computed, and scale-out analysis may be initiated if the average increases beyond a threshold. Other types of criteria, some of which may utilize additional lower-level scale-out parameters, may be used in different embodiments.

The time period 707 over which workload is to be measured to determine the peak workload level associated with a given throttling key may represent another scale-out parameter in the depicted embodiment. The throttling limit delta 710 (the amount by which the throttling limit should be increased if the peak workload satisfies a criterion) may also be a scale-out parameter in at least one embodiment. As discussed earlier, the customers of the HS may be classified into groups, and the customer classification/category 712 may influence values of other scale-out parameters in some embodiments. For example, for two classes of customers Class-A and Class-B, respective time periods 707, respective throttling limit deltas 710, respective scale-out triggering criteria 706, and/or respective resource oversubscription factors 714 may be employed in one embodiment. The resource oversubscription factor 714 refers to the extent to which the HSs and the CSs may rely on the assumption that not all the end user requests corresponding to the throttling limits of various throttling keys are likely to be processed concurrently, so it may be possible to provision fewer resources that would be required to handle the sum of the throttling limits of all the keys. If a resource oversubscription factor of 0.9 is used, for example, this means that 90% of the request processing capacity that would be needed to fulfill the sum of the throttling limits should be provisioned at any given CS. Accordingly, when computing the number of resources that should actually be added for a proposed increase in throttling limit for any given throttling key, a reduction of 10% to the number that may be needed if all the end user requests corresponding to the new throttling limit may be applied.

In some embodiments, constituent-service-specific parameters 716 may also be used for scale-out workflows. For example, the amount of processing power needed at a CS that implements ASR and/or NLU may be dependent on the average dialog audio duration (how long an end user whose request is associated with a given throttling key speaks on average during each interaction), so an indication of such an average may be taken into account when computing scale-out resource needs. In at least some embodiments, parameters other than those shown in FIG. 7 may be used when implementing scale-out analysis and scale-out workflows of the kind described earlier. In at least some embodiments, analogous parameters to those shown in FIG. 7 may be used for scale-in operations as well—e.g., a throttling limit delta parameter may be used to reduce a throttling limit, a time period parameter may be used to determine the peak workload associated with various throttling keys, and so on. In one embodiment, programmatic interfaces may be provided by an SMS and/or an HS to allow administrators or other authorized users to view and/or modify one or more of the scale-out or scale-in parameters such as those shown in FIG. 7.

Figure 8:
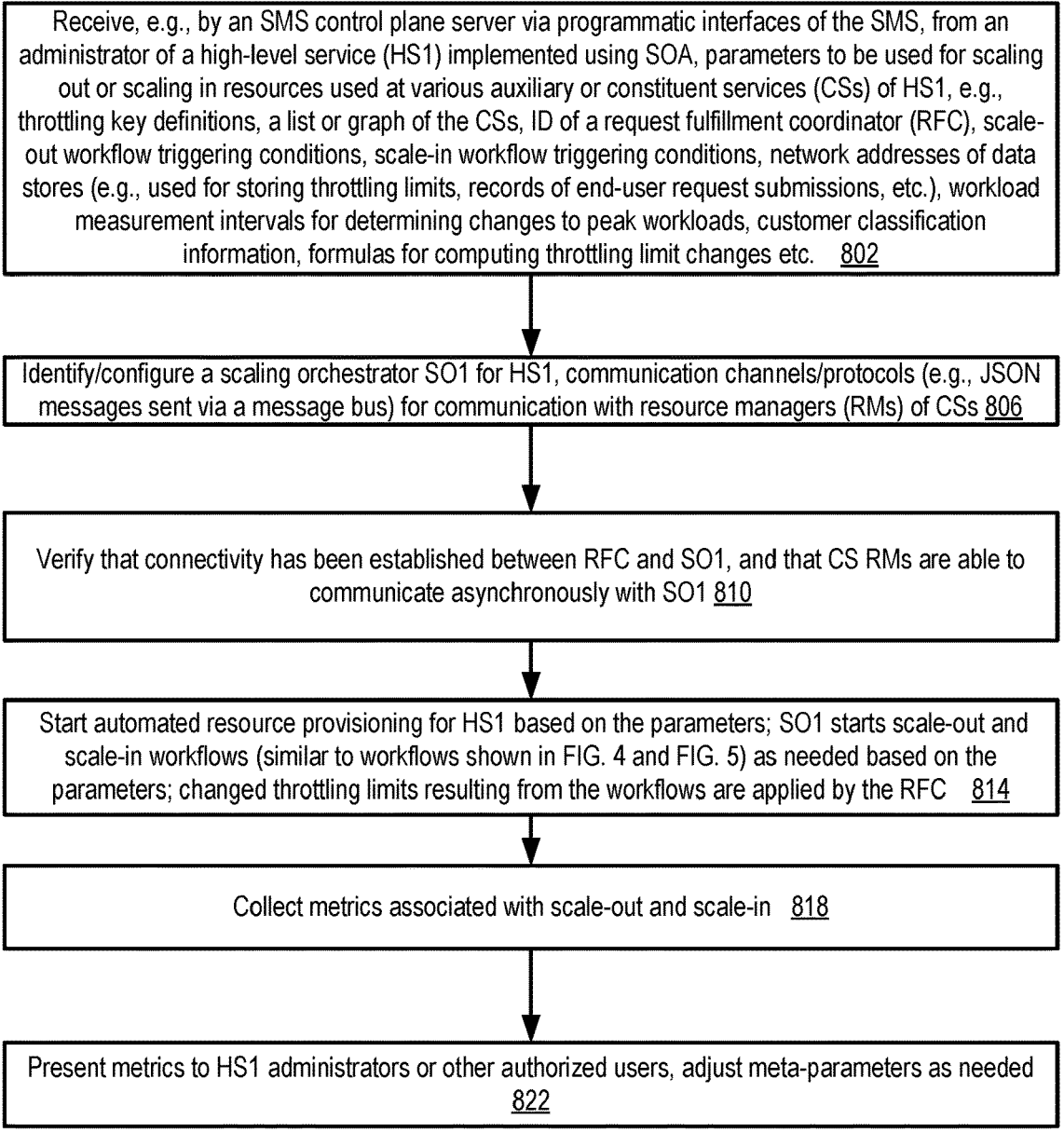
FIG. 8 is a flow diagram illustrating aspects of operations which may be performed to scale out and scale in distributed applications and services utilizing service-oriented architectures, according to at least some embodiments.

FIG. 8 is a flow diagram illustrating aspects of operations which may be performed to scale out and scale in distributed applications and services utilizing service-oriented architectures, according to at least some embodiments. As shown in element 802, various parameters to be used for scaling out or scaling in resources at CSs of a high-level service HS1 may be obtained/received, e.g., from an administrator of HS1 via programmatic interfaces of an SMS similar in features and functionality to SMS 156 of FIG. 1. The parameters may include, among others, throttling key definitions, a list or graph of the CSs, an ID (such as a network address) of a request fulfillment coordinator (RFC) of HS1, scale-out workflow triggering conditions, scale-in workflow triggering conditions, network addresses of data stores (e.g., used for storing throttling limits, records of end user request submissions, etc.), workload measurement intervals for determining changes to peak workloads, customer classification information, formulas for computing throttling limit changes, and so on. The parameters may be received at a control plane server of the SMS in some embodiments. In some embodiments, the specific set of end user request characteristics (e.g., in the case of DAMS scale-out, the average end user utterance duration, the language used, etc.) which should be indicated as parameters in scale-out requirement messages by an SO, in addition to proposed throttling limit changes, may be indicated via programmatic interfaces by the HS1 administrator during this stage of operations.

A scaling orchestrator SO1 may be identified or configured at the SMS in the depicted embodiment for HS1 (element 806). In some embodiments, the SMS may maintain a pool of SOs (e.g., with a given SO comprising a set of processes or threads of execution running at one or more virtualized or physical servers), and one of the SOs of the pool may be assigned to HS1. In other embodiments, a new SO process or set of processes/threads may be launched for HS1. Communication channels and protocols to be used for communication between SO1 and the RFC, as well as for communication between SO1 and RMs of HS1's CSs, may be selected by the SMS control plane, e.g., based on preferences indicated by the HS1 administrator. For example, in one implementation, a decision may be made that the scale-out and scale-in requirements are to be expressed as JSON (JavaScript Object Notation) files, and that a message bus offering a publish/subscribe set of interfaces is to be used for communication between SO1 and the RMs. In some embodiments, such a message bus may be set up by the SMS, e.g., using a provider network service.

The SMS control plane server may verify that connectivity has been established between the RFC and SO1, and that the CS RMs of HS1 are able to communicate asynchronously (e.g., that the RMs have subscribed to obtain messages published to a message bus) in the depicted embodiment (element 810). Such verification may, for example, comprise requesting the entities involved (SO1, the RFC and the RMs) to send messages to each other via the selected channels and to acknowledge receipt of such messages.

Automated resource provisioning for HS1 may then be initiated in the depicted embodiment (element 814) based on the parameters that were obtained. Initial throttling limits may be assigned to various throttling keys. SO1 may start its scale-out and scale-in workflows of the kind shown in FIG. 4 and FIG. 5 in response to triggering conditions indicated in the parameters, and the RMs may start implementing their respective CS-level scale-out and scale-in parameters asynchronously with respect to one another. The changes to throttling keys resulting from the scale-out and scale-in workflows may be applied by the RFC to end user requests. Metrics associated with the scale-out and scale-in operations may be collected by the control plane server of the SMS in various embodiments (element 818). The metrics may be presented to HS1 administrators and/or other authorized users, and the parameters used for scale-out or scale-in may be adjusted as needed by the SMS control plane server in the depicted embodiment (element 822), e.g., based on analysis of the metrics and/or based on feedback or input received programmatically from the administrators or authorized users. It is noted that in various embodiments, some of the operations shown in the flow diagram of FIG. 8 (and/or the scale-out or scale-in workflows illustrated earlier) may be implemented in a different order than that shown, or may be performed in parallel rather than sequentially. Additionally, some of the operations shown in FIG. 8 and/or the scale-out and scale-in workflows may not be required in one or more implementations.

Figure 9:
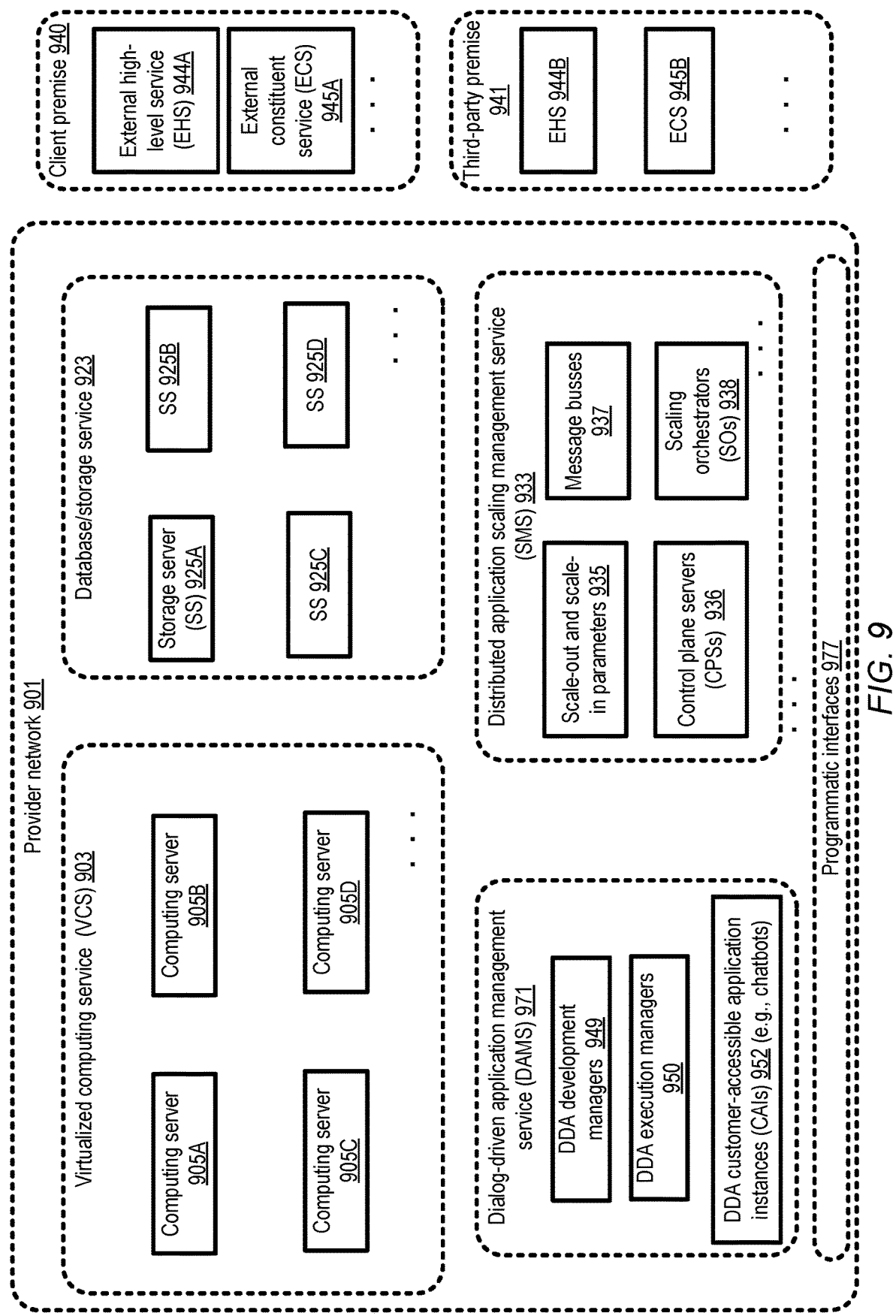
FIG. 9 illustrates an example provider network at which a scaling management service may be implemented, according to at least some embodiments.

In some embodiments, as mentioned earlier, automated provisioning techniques using scaling orchestrators of the kind introduced herein may be implemented at a cloud provider network or cloud computing environment. FIG. 9 illustrates an example provider network at which a scaling management service may be implemented, according to at least some embodiments. In the depicted embodiment, provider network 901 may comprise resources used to implement a plurality of network-accessible services, including for example a virtualized computing service (VCS) 903, a database/storage service 923, a DAMS 971 (similar in features and functionality to DAMS 203 of FIG. 2) as well as an SMS 933. The SMS 933, similar in features and functionality to SMS 156 of FIG. 1, may include CPSs 936 and SOs 938. Scale-out and scale-in parameters 935 may be stored for various other high-level services (including for example the DAMS) for which automated provisioning is to be implemented with the help of the SOs in the depicted embodiment. The CPSs may configure the SOs and a set of message busses 937 in the depicted embodiment which can be utilized for asynchronous communications between the SOs and the resource managers of constituent services of the kind described above.

The DAMS 971 may include DDA (dialog-driven application) development managers 949, which coordinate the process of creation and deployment of DDA customer-accessible application instances (CAIs) 952 such as chatbots. The DAMS may also include DDA execution managers 950 which coordinate the tasks needed for executing the CAIs in response to end user requests in the depicted embodiment. The DDA execution managers may, for example, comprise one or more RFCs of the kind described earlier.

In some cases, other distributed high-level services (HSs) for which resource provisioning is to be automated with the help of SOs may be run using provider network resources. For example, some of the business logic of an HS (and/or the CSs of the HS) may be run at computing servers 905 of the VCS, such as computing server 905A, 905B, 905C or 905D. Data being accessed as part of the HS may be stored at storage servers of the database/storage service 923, such as SS 925A, 925B, 925C or 925D. In at least one embodiment, resources external to the provider network may be used to run portions (or all) of the HSs. For example, external high-level service (EHS) 944A may be run at least in part at a client premise 940 (e.g., a data center of a customer of the provider network). EHS 944A may utilize external constituent service (ECS) 945A in the depicted embodiment. EHS 944B may be run at least in part at a third-party premise 941 (a premise which is not part of the provider network, and is not owned by the SMS customer on whose behalf resource provisioning is to be automated for EHS 944B). EHS 944B may utilize ECS 945B in the depicted embodiment. In some cases, the HSs for which SOs are used to automate resource provisioning may include some CSs implemented within the provider network and other CSs implemented outside at one or more premises outside the provider network.

Components of a given service of a provider network may utilize components of other services in the depicted embodiment—e.g., virtual machines or compute instances implemented at computing servers such as 905A-905D of the virtualized computing service 903 may be used for implementing CPSs 936, SOs 938 and the like, log records and/or event records generated during scale-in and scale-out workflows coordinated by SOs may be database/storage service 923, and so on.

Individual ones of the services shown in FIG. 9 may implement a respective set of programmatic interfaces 977 which can be used by external and/or internal clients (where the internal clients may comprise components of other services) in the depicted embodiment. In at least some embodiments, resources of a cloud provider network may not be required for the kinds of automated resource provisioning techniques introduced above; instead, for example, a standalone set of servers may be used.

A provider network 901 can be formed as a number of regions in some embodiments, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN (virtual private network) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, an SMS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

The cloud provider network may implement various computing resources or services, which may include an SMS, a VCS, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

A VCS 903 of the cloud provider network may offer virtual compute instances (also referred to as virtual machines, or simply "instances") with varying computational and/or memory resources in various embodiments. In one embodiment, each of the virtual compute instances may correspond to one of several instance types or families, and instances of any of several families may be employed for the web information extraction model preparation and execution workflow. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Various components of an SMS, as well as components of the high-level services and constituent services whose resources are managed with the help of the SMS, may be run using containers in at least some embodiments.

Figure 10:
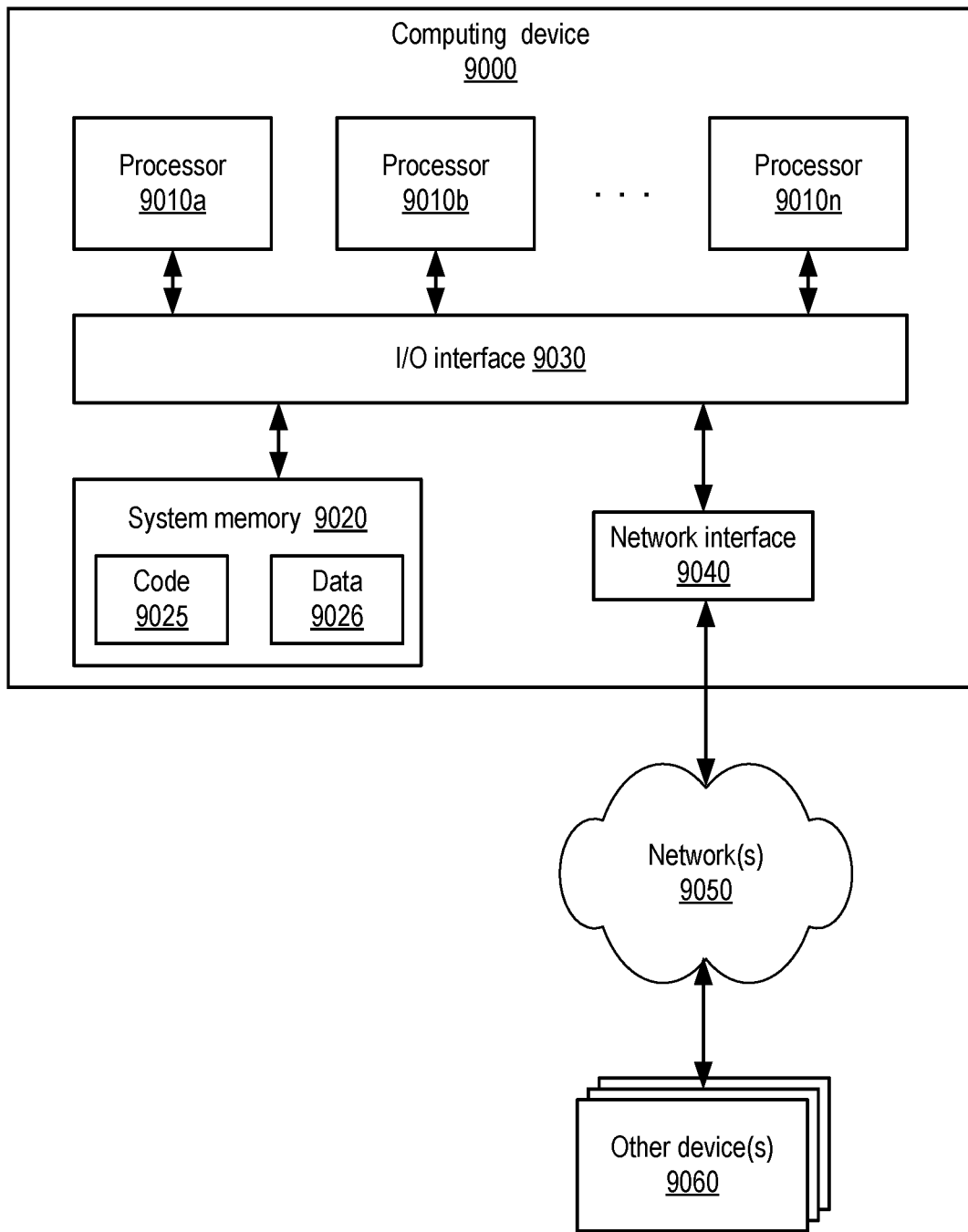
FIG. 10 is a block diagram illustrating an example computing device that may be used in at least some embodiments.

The traffic and operations of the cloud provider network, and individual services such as the SMS, may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control plane servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components of services such as the SMS) may share the virtualized servers with the data plane. Control plane traffic and data plane traffic may be sent over separate/distinct networks in some cases In at least some embodiments, a server that implements the types of techniques described herein (e.g., including functions of an SMS and/or other services of a cloud provider network) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
receive a particular client request at a request fulfillment coordinator of a particular service of a distributed computing environment, wherein in accordance with a service-oriented architecture the particular service utilizes a plurality of auxiliary services to fulfill client requests, including a first auxiliary service and a second auxiliary service, and wherein resources of individual ones of the auxiliary services are managed by respective resource managers;
in response to determining, by the request fulfillment coordinator, using a first throttling limit associated with a throttling key of the particular client request, that a scale-out analysis criterion has been satisfied, cause, by the request fulfillment coordinator, a scale-out analysis request associated with the throttling key to be obtained at a scaling orchestrator;
determine, by the scaling orchestrator, a peak workload metric associated with the throttling key;
based at least in part on analysis of the peak workload metric, cause, by the scaling orchestrator, a scale-out requirement associated with the throttling key to be obtained at a plurality of resource managers, including a first resource manager of the first auxiliary service and a second resource manager of the second auxiliary service;
initiate, by the first resource manager, a first set of resource provisioning tasks to fulfill the scale-out requirement associated with the throttling key, wherein the first set of resource provisioning tasks comprises adding a first amount of request processing capacity to the first auxiliary service;
initiate, by the second resource manager, asynchronously with respect to the first set of resource provisioning tasks, a second set of resource provisioning tasks to fulfill the scale-out requirement associated with the throttling key, wherein the second set of resource provisioning tasks comprises adding a second amount of request processing capacity to the second auxiliary service; and
update, by the scaling orchestrator in response to determining that the first set of resource provisioning tasks and the second set of resource provisioning tasks have been completed, the first throttling limit to a second throttling limit which exceeds the first throttling limit; and
utilize, by the request fulfillment coordinator, the second throttling limit to determine whether to accept an additional client request associated with the throttling key.

2. The system as recited in claim 1, wherein the one or more computing devices include further instructions that upon execution on or across the one or more computing devices:
reject, by the request fulfillment coordinator, the particular client request based at least in part on a determination that accepting the particular client request would violate the first throttling limit, wherein determining that the scale-out analysis criterion has been satisfied is based at least in part on determining that the particular client request is rejected.

3. The system as recited in claim 1, wherein the one or more computing devices include further instructions that upon execution on or across the one or more computing devices:
categorize owners of customer-accessible application instances hosted at the particular service into a plurality of classes based on one or more of: (a) a measure of complexity of client requests associated with individual ones of the customer-accessible application instances, (b) an arrival rate of client requests associated with individual ones of the customer-accessible application instances, (c) a temporal distribution of client requests associated with individual ones of the customer-accessible application instances, (d) a geographical distribution of client requests associated with individual ones of the customer-accessible application instances or (e) a language used for client requests associated with individual ones of the customer-accessible application instances, wherein the throttling key is associated with an owner of a particular customer-accessible application instance; and
compute the second throttling limit using a class-dependent computation, wherein a parameter of the class-dependent computation indicates a particular class of the owner of the particular customer-accessible application instance.

4. The system as recited in claim 1, wherein the one or more computing devices include further instructions that upon execution on or across the one or more computing devices:
initiate, in accordance with a schedule, a scale-in iteration, wherein the scale-in iteration comprises:
based at least in part on analysis of respective client request workloads associated with individual ones of a set of candidate throttling keys for throttling limit reduction, reducing a particular throttling limit associated with a particular candidate throttling key;
initiating, by the first resource manager, a first set of resource releasing tasks at the first auxiliary service in accordance with a reduction in the particular throttling limit; and
initiating, by the second resource manager, asynchronously with respect to the first set of resource releasing tasks, a second set of resource releasing tasks at the second auxiliary service in accordance with the reduction in the particular throttling limit.

5. The system as recited in claim 1, wherein the one or more computing devices include further instructions that upon execution on or across the one or more computing devices:
cause to be presented, via one or more programmatic interfaces, a set of metrics associated with the throttling key, including one or more of: (a) the first throttling limit, (b) the second throttling limit, (c) a total measured client request rate during a time interval, (d) a measured client request rejection rate during a time interval, or (e) an elapsed time between determination that the scale-out analysis criterion has been satisfied, and an update of the first throttling limit to the second throttling limit.

6. A computer-implemented method, comprising:
one or more computing devices;
wherein the one or more computing devices include instructions that upon execution on or across the one or more computing devices:
based at least in part on an analysis of workload associated with a first throttling key of a first client request directed to a first network-accessible service, causing a first scale-out requirement associated with the first throttling key to be obtained at a plurality of resource managers, including a first resource manager of a second network-accessible service utilized by the first network-accessible service to respond to at least some client requests, and a second resource manager of a third network-accessible service utilized by the first network-accessible service to respond to at least some client requests;
initiating, by the first resource manager, a first set of resource provisioning tasks at the second network-accessible service to fulfill the first scale-out requirement;
initiating, by the second resource manager, asynchronously with respect to the first set of resource provisioning tasks, a second set of resource provisioning tasks at the third network-accessible service to fulfill the first scale-out requirement;
updating, in response to determining that the first set of resource provisioning tasks and the second set of resource provisioning tasks have been completed, a first throttling limit associated with the first throttling key to a second throttling limit; and
utilizing the second throttling limit to determine whether to accept, at the first network-accessible service, an additional client request associated with the first throttling key.

7. The computer-implemented method as recited in claim 6, wherein the first client request is directed to a first customer-accessible application instance of a plurality of customer-accessible application instances hosted at the first network-accessible service, wherein the first customer-accessible application instance implements one or more of: (a) a particular bot of a plurality of dialog-driven bots of the first network-accessible service, (b) a particular data store of a plurality of data stores of the first network-accessible service, or (c) a particular multi-layer web application of a plurality of multi-layer web applications of the first network-accessible service.

8. The computer-implemented method as recited in claim 6, wherein the first client request comprises a request to establish a network connection with an instance of a dialog-driven application implemented at the first network-accessible service, wherein the second network-accessible service comprises one or more of: (a) an automated speech recognition (ASR) service, (b) a natural language understanding (NLU) service, (c) a request state information storage service, or (d) a machine learning artifact management service.

9. The computer-implemented method as recited in claim 6, wherein the first client request is directed to a first customer-accessible application instance hosted at the first network-accessible service, the computer-implemented method further comprising:
storing, at the first network-accessible service, identity information of an owner of the first customer-accessible application instance, on whose behalf the first customer-accessible application instance is hosted at the first network-accessible service, wherein a second customer-accessible application instance is hosted at the first network-accessible service on behalf of the owner;
determining the first throttling key based at least in part on the identity information of the owner, wherein utilizing the second throttling limit to determine whether to accept the additional client request comprises:
computing a sum of (a) a first number of in-progress client requests directed to the first customer-accessible application instance and (b) a second number of in-progress client requests directed to the second customer-accessible application instance; and
determining whether the sum exceeds the second throttling limit.

10. The computer-implemented method as recited in claim 6, wherein the first client request is directed to a first customer-accessible application instance hosted at the first network-accessible service, the computer-implemented method further comprising:
storing, at the first network-accessible service, identity information of an owner of the first customer-accessible application instance; and
determining the first throttling key based at least in part on the identity information of the owner, wherein utilizing the second throttling limit to determine whether to accept the additional client request comprises determining whether a number of in-progress client requests directed to the first customer-accessible application instance exceeds the second throttling limit.

11. The computer-implemented method as recited in claim 6, further comprising:
receiving the first client request at the first network-accessible service;
rejecting the first client request by the first network-accessible service based at least in part on a determination that accepting the first client request would violate the first throttling limit; and
causing, based at least in part on determining that the first client request was rejected, the first scale-out requirement associated with the first throttling key is to be generated.

12. The computer-implemented method as recited in claim 6, further comprising:
categorizing owners of customer-accessible application instances hosted at the first network-accessible service into a plurality of classes based on one or more of: (a) a measure of complexity of client requests associated with individual ones of the customer-accessible application instances, (b) an arrival rate of client requests associated with individual ones of the customer-accessible application instances, (c) a temporal distribution of client requests associated with individual ones of the customer-accessible application instances, (d) a geographical distribution of client requests associated with individual ones of the customer-accessible application instances or (e) a language used for client requests associated with individual ones of the customer-accessible application instances, wherein the first throttling key is associated with an owner of a particular customer-accessible application instance; and computing the second throttling limit using a class-dependent computation, wherein a parameter of the class-dependent computation indicates a particular class of the owner of the particular customer-accessible application instance.

13. The computer-implemented method as recited in claim 6, further comprising:

initiating, in accordance with a schedule, a scale-in iteration, wherein the scale-in iteration comprises:

identifying a set of candidate throttling keys for throttling limit reduction;

based at least in part on analysis of respective client request workloads associated with individual ones of the candidate throttling keys, reducing a particular throttling limit associated with a particular candidate throttling key;

initiating, by the first resource manager, a first set of resource releasing tasks at the second network-accessible service in accordance with a reduction in the particular throttling limit; and initiating, by the second resource manager, asynchronously with respect to the first set of resource releasing tasks, a second set of resource releasing tasks at the third network-accessible service in accordance with the reduction in the particular throttling limit.

14. The computer-implemented method as recited in claim 6, further comprising:

performing the analysis of the workload associated with the first throttling key, wherein said performing comprises:

determining, based at least in part on a portion of the first throttling key, a time period over which workload associated with the first throttling key is to be monitored; and determining a peak rate of client requests associated with the first throttling key during the time period, including a rate of client requests that were accepted at the first network-accessible service, and a rate of client requests that were rejected at the first network-accessible service.

15. The computer-implemented method as recited in claim 6, further comprising:

causing to be presented, via one or more programmatic interfaces, a set of metrics associated with the first throttling key, including one or more of: (a) the first throttling limit, (b) the second throttling limit, (c) a total measured client request rate during a time interval, (d) a measured client request rejection rate during a time interval, (e) an elapsed time between generation of the first scale-out requirement and an update of the first throttling limit to the second throttling limit.

16. One or more non-transitory computer-accessible storage media storing program instructions that when executed on or across one or more processors:

based at least in part on an analysis of workload associated with a first throttling key of a first client request directed to a first network-accessible service, cause a first scale-out requirement associated with the first throttling key to be obtained at a plurality of resource managers, including a first resource manager of a second network-accessible service utilized by the first network-accessible service to respond to at least some client requests, and a second resource manager of a third network-accessible service utilized by the first network-accessible service to respond to at least some client requests;

initiate, by the first resource manager, a first set of resource provisioning tasks at the second network-accessible service to fulfill the first scale-out requirement;

initiate, by the second resource manager, asynchronously with respect to the first set of resource provisioning tasks, a second set of resource provisioning tasks at the third network-accessible service to fulfill the first scale-out requirement;

update, in response to determining that the first set of resource provisioning tasks and the second set of resource provisioning tasks have been completed, a first throttling limit associated with the first throttling key to a second throttling limit; and utilize the second throttling limit to determine whether to accept, at the first network-accessible service, an additional client request associated with the first throttling key.

17. The one or more non-transitory computer-accessible storage media as recited in claim 16, storing further program instructions that when executed on or across the one or more processors:

reject the first client request based at least in part on a determination that accepting the first client request would violate the first throttling limit, wherein analysis of the workload associated with the first throttling key is initiated based at least in part on determining that the first client request is rejected.

18. The one or more non-transitory computer-accessible storage media as recited in claim 16, storing further program instructions that when executed on or across the one or more processors:

categorize owners of customer-accessible application instances hosted at the first network-accessible service into a plurality of classes based on one or more of: (a) a measure of complexity of client requests associated with individual ones of the customer-accessible application instances, (b) an arrival rate of client requests associated with individual ones of the customer-accessible application instances, (c) a temporal distribution of client requests associated with individual ones of the customer-accessible application instances, (d) a geographical distribution of client requests associated with individual ones of the customer-accessible application instances or (e) a language used for client requests associated with individual ones of the customer-accessible application instances, wherein the first throttling key is associated with an owner of a particular customer-accessible application instance; and compute the second throttling limit using a class-dependent computation, wherein a parameter of the class-dependent computation indicates a particular class of the owner of the particular customer-accessible application instance.

19. The one or more non-transitory computer-accessible storage media as recited in claim 16, storing further program instructions that when executed on or across the one or more processors:

initiate a scale-in workflow, wherein the scale-in workflow comprises:

based at least in part on analysis of respective client request workloads associated with individual ones of one or more candidate throttling keys for throttling limit reduction, reducing a particular throttling limit associated with a particular candidate throttling key;

initiating, by the first resource manager, a first set of resource releasing tasks at the second network-accessible service in accordance with a reduction in the particular throttling limit; and initiating, by the second resource manager, asynchronously with respect to the first set of resource releasing tasks, a second set of resource releasing tasks at the third network-accessible service in accordance with the reduction in the particular throttling limit.

20. The one or more non-transitory computer-accessible storage media as recited in claim 16, storing further program instructions that when executed on or across the one or more processors:

perform the analysis of the workload associated with the first throttling key, wherein the analysis of the workload comprises computing a sum of (a) a rate of client requests, associated with the first throttling key, that were accepted at the first network-accessible service during a time interval and (b) a rate of client requests, associated with the first throttling key, that were rejected at the first network-accessible service during the time interval.

\* \* \* \* \*